United States Patent
Shima

(10) Patent No.: US 8,204,963 B2
(45) Date of Patent: Jun. 19, 2012

(54) DOWNLOAD CONTROL OF INFORMATION FROM SERVER CONNECTED TO NETWORK

(75) Inventor: Toshihiro Shima, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 1284 days.

(21) Appl. No.: 11/795,083

(22) PCT Filed: Jan. 10, 2006

(86) PCT No.: PCT/JP2006/000416
§ 371 (c)(1),
(2), (4) Date: Jul. 11, 2007

(87) PCT Pub. No.: WO2006/077783
PCT Pub. Date: Jul. 27, 2006

(65) Prior Publication Data
US 2010/0036905 A1    Feb. 11, 2010

(30) Foreign Application Priority Data

Jan. 18, 2005  (JP) .................... 2005-009988
Jan. 18, 2005  (JP) .................... 2005-009990
Feb. 23, 2005  (JP) .................... 2005-046570

(51) Int. Cl.
*G06F 15/16* (2006.01)

(52) U.S. Cl. ........ 709/219; 709/201; 709/229; 358/1.15

(58) Field of Classification Search .................. 709/201, 709/219, 223, 226, 229; 358/1.15
See application file for complete search history.

(56) References Cited

U.S. PATENT DOCUMENTS 7,002,703 B2* 2/2006 Parry ............................ 358/1.15
7,262,872 B2* 8/2007 Nakamura .................... 358/1.14
7,290,031 B2* 10/2007 Yamashita ..................... 709/203
7,376,725 B2  5/2008 Takahashi et al.
(Continued)

FOREIGN PATENT DOCUMENTS

JP  11-272711 A  10/1999
(Continued)

OTHER PUBLICATIONS

Steven D. Kaczmarek: "Microsoft Systems Management Server 2003 Administrator's Companion, Ch. 12" Jan. 21, 2004, Microsoft Press, XP002519954, pp. 3, 4, 28-30, 33-37, 39-42, 44, 48, 52-53.

*Primary Examiner* — Mohamed Ibrahim

(57) ABSTRACT

At a download time, each of multiple printers connecting with a network identifies storage or non-storage of any unsent download request file, which has not yet been sent to a management server. In the case of storage of any unsent download request file, the printer collects from the other printers unsent download request files, which are stored in the other printers and have not yet been sent to the management server, and sends the collected download request files and the unsent download request file stored in the self printer to the management server. The printer receives a download data file sent back from the management server in response to the download request files, creates delivery data from the received download data file, and distributes relevant delivery data to each of the other printers. This arrangement effectively reduces the access frequency from the respective printers to the management server for download of specific information, which is to be used by the respective printers, from the management server.

12 Claims, 20 Drawing Sheets

U.S. PATENT DOCUMENTS

| | | |
|---|---|---|
| 2004/0083494 A1 | 4/2004 | Sakurai |
| 2004/0143566 A1* | 7/2004 | Fukasawa ......................... 707/1 |
| 2004/0170460 A1 | 9/2004 | Mokuya et al. |
| 2004/0179230 A1* | 9/2004 | Kitada et al. ................. 358/1.15 |
| 2005/0141023 A1* | 6/2005 | Yagita et al. ................. 358/1.15 |

FOREIGN PATENT DOCUMENTS

| | | |
|---|---|---|
| JP | 2000-200233 A | 7/2000 |
| JP | 2001-243030 A | 9/2001 |
| JP | 2003-006069 A | 1/2003 |
| JP | 2003-186785 A | 7/2003 |
| JP | 2004-139240 A | 5/2004 |
| JP | 2004-185351 A | 7/2004 |
| JP | 2004-220564 A | 8/2004 |
| JP | 2004-234625 A | 8/2004 |
| JP | 2004-302650 A | 10/2004 |

* cited by examiner

DOWNLOAD CONTROL OF INFORMATION FROM SERVER CONNECTED TO NETWORK

TECHNICAL FIELD

The present invention relates to a technique of downloading required information, which is to be used by each device, from a server connected to the device via a network.

BACKGROUND ART

In a system proposed with the spread of the network technology including the Internet and local area networks, a management server connecting with a network manages multiple devices, such as printers, connecting with the network (see, for example, Japanese Patent Laid-Open Gazette No. 2004-185351). In this prior art system, each device connecting with the network utilizes, for example, a network board built in the device to obtain monitor information with regard to the device, for example, an operating status of the device, and individually sends the obtained monitor information to the management server. When the device is a printer, the monitor information is, for example, the total number of prints, the total consumption of ink or toner, the remaining amount of ink or toner, or error information. In this system, the management server stores specific information including latest programs and various data to be used by the respective devices. Each device individually downloads required programs and data from the management server. For example, the technique disclosed in Japanese Patent Laid-Open Gazette No. 2003-186785 downloads the contents from a main server and distributes the downloaded contents to each user terminal.

In the proposed system, there may be a firewall between the management server and each device. In this case, the management server may not be allowed to push the respective devices for download of the specific information including the latest programs and the various data from the management server to the respective devices. In the pull-type download technique, each device sends a download request for the specific information to the management server and downloads the specific information from the management server. With an increase in number of devices as the management target of the management server, a large number of devices may simultaneously make access to the management server and send the download requests to the management server. Such simultaneous access and transmission may interfere with smooth processing for the received download requests in the management server. This problem is commonly found in various systems including a management server for managing not only printers but other diverse devices connecting with a network.

The use of a high-performance management server in the system reduces the potential of the above problems but undesirably increases the cost. Another possible measure against the above problems without using the high-performance management server causes one device to collect download requests from the other devices and send the collected download requests to the management server. This reduces the access frequency from the respective devices to the management server. The simultaneous collection of the download requests from the other devices to one device, however, abruptly increases the network traffic. This may interfere with smooth communication in the network.

By taking into account such problems of the prior art, in an information distributing system where specific information to be used by each of multiple devices is downloaded from a server to the device, there is a need of reducing the access frequency from the respective devices to the management server. There is also a need of restraining an abrupt increase in network traffic by transmission of download requests.

DISCLOSURE OF THE INVENTION

In order to satisfy at least part of the above and the other related demands, the present invention is directed to an information distribution control apparatus that is built in a device connecting with a network and downloads specific information, which is to be used by the device, from a server connecting with the network.

The information distribution control apparatus includes: a download request storage module that stores a download request for downloading the specific information from the server; a decision module that determines at a preset timing whether any download request for transmission, which is to be sent to the server, is stored in the download request storage module; a download request collection module that, upon determination of storage of the download request for transmission in the download request storage module by the decision module, sends a transmission request to another device connecting with the network for sending back a download request for transmission, which is to be sent to the server and is stored in the another device, and collects the download request for transmission sent back from the another device as a response to the transmission request; a transmission module that sends the collected download request for transmission and the download request for transmission stored in the download request storage module to the server; a receiving module that receives specific information, which corresponds to the download requests sent to the server, from the server as a response to transmission of the download requests; and a delivery module that distributes a relevant information part, which corresponds to the collected download request from the another device among the received specific information, to the another device.

The information distribution control apparatus of the invention is built in a device connecting with the network in the form of, for example, a network card or a network board. The device may be any of diverse devices connecting with the network, for example, a printer, a scanner, a projector, an audio device, an electrical appliance, a client computer, or a PDA (personal digital assistant). The terminology 'preset timing' represents a timing set for download of the specific information, which is to be used by the device, from the server. This timing may hereafter be referred to as a download time.

In the case of storage of the download request for transmission, which is to be sent to the server, in the download request storage module at the download time, the information distribution control apparatus of the invention collects the download request for transmission, which is to be sent to the server and is stored in another device, from the another device and sends the collected download request for transmission together with the download request for transmission stored in the download request storage module to the server. In the case of no storage of the download request for transmission, which is to be sent to the server, in the download request storage module at the download time, on the other hand, the information distribution control apparatus of the invention does not collect the download request for transmission from the another device and does not send the download requests to the server. Namely there is an occasion of neither collecting the download request for transmission from the another device nor sending the download requests to the server even at the download time. This arrangement desirably reduces the access frequency from the information distribution control apparatus or the device to the server.

In one preferable embodiment of the information distribution control apparatus of the invention, upon determination of no storage of the download request for transmission in the download request storage module by the decision module, the download request collection module prohibits the collection of the download request from the another device.

Upon determination of no storage of the download request for transmission, which is to be sent to the server, in the download request storage module at the download time, the information distribution control apparatus of this embodiment does not collect the download request for transmission from the another device and does not send the download requests to the server. This arrangement desirably reduces the access frequency from the information distribution control apparatus to the server.

In one aspect of the invention, the information distribution control apparatus further includes an identification information storage module that stores identification information for identifying the device with the built-in information distribution control apparatus. The download request collection module collects identification information for identifying the another device from the another device. The transmission module sends the collected download request in correlation to the identification information collected from the another device and the download request stored in the download request storage module in correlation to the identification information stored in the identification information storage module.

The identification information may be, for example, a name, an MAC address, an IP address, or a production number allocated to each device. The identification information enables the server to readily identify the device sending each download request.

In another aspect of the invention, the information distribution control apparatus further includes a download request file creation module that creates a download request file that integrally records the collected download request and the download request stored in the download request storage module. The transmission module sends the created download request file to the server.

This arrangement allows simultaneous transmission of the download requests with regard to multiple devices to the server and thus effectively controls the network traffic.

In still another aspect of the invention, the information distribution control apparatus further includes a download request deletion module that, in response to reception of the specific information from the server, deletes the download request that is stored in the download request storage module and corresponds to a relevant information part among the received specific information.

In the information distribution control apparatus of this aspect, all the download requests stored in the download request storage module are the download request for transmission that are to be sent to the server. The decision module can thus readily identify storage or non-storage of any download request for transmission, which is to be sent to the server, in the download request transmission module.

In another aspect of the invention, the information distribution control apparatus further includes: an information storage module that stores the specific information received from the server; and a delivery request receiving module that receives from the another device a delivery request of the relevant information part, which corresponds to the download request collected from the another device. The delivery module distributes the relevant information part as a response to the delivery request.

The relevant information part among the specific information received from the server is accordingly distributed to the another device at the timing demanded by the another device. The relevant information part among the specific information received from the server may otherwise be distributed to the another device regardless of the delivery request from the another device but at any predetermining timing in the information distribution control apparatus, for example, immediately after the download of the specific information from the server.

In another preferable embodiment of the information distribution control apparatus of the invention, the delivery module distributes the relevant information part together with a deletion request for deleting the download request corresponding to the relevant information part.

The another device deletes the sent download request, in response to the deletion request received from the information distribution control apparatus. All the download requests stored in the another device are thus the download requests for transmission that are to be sent to the server. The another device can thus readily identify storage or non-storage of any download request for transmission, which is to be sent to the server.

In still another aspect of the invention, the information distribution control apparatus further includes a transmission request receiving module that receives the transmission request from the another device. In response to reception of the transmission request, the transmission module sends the download request for transmission, which is to be sent to the server and is stored in the download request storage module, to the another device as a sender of the transmission request.

The information distribution control apparatus of this aspect sends the download request for transmission to the another device, in response to the transmission request received from the another device.

In one preferable embodiment of the information distribution control apparatus of this aspect having the transmission request receiving module, the transmission module sends the another device a delivery request for a relevant information part corresponding to the download request sent to the another device.

The another device sends the download requests to the server and downloads the specific information corresponding to the download requests from the server. This arrangement enables the another device to distribute the relevant information part among the specific information received from the server, in response to the delivery request.

In the information distribution control apparatus of this embodiment, the receiving module receives from the another device the relevant information part corresponding to the download request sent to the another device, in response to the delivery request.

The information distribution control apparatus accordingly receives the relevant information part, in response to the delivery request, from the another device that has downloaded the specific information from the server.

In another preferable embodiment of the information distribution control apparatus of this aspect having the transmission request receiving module, the information distribution control apparatus further includes: a deletion request receiving module that receives from the another device a deletion request for deleting the download request sent to the another device; and a download request deletion module that, in response to reception of the deletion request, deletes the download request that is stored in the download request storage module and has been sent to the another device.

The information distribution control apparatus of this embodiment deletes the sent download request, which has been sent to the another device, in response to the deletion request received from the another device.

The present invention is also directed to another information distribution control apparatus that is built in a device connecting with a network and downloads specific information, which is to be used by the device, from a server connecting with the network.

The information distribution control apparatus includes: a download request storage module that stores a download request for downloading the specific information from the server; a download request collection module that sends a transmission request to another device connecting with the network for sending back a download request for transmission, which is to be sent to the server and is stored in the another device, and collects the download request for transmission sent back from the another device as a response to the transmission request; a transmission module that sends the collected download request for transmission and a download request for transmission stored in the download request storage module to the server; a receiving module that receives specific information, which corresponds to the download requests sent to the server, from the server as a response to transmission of the download requests; a delivery module that distributes a relevant information part, which corresponds to the collected download request from the another device among the received specific information, to the another device; and a decision module that identifies requirement or non-requirement for the collection of the download request, based on a predetermined condition at a preset timing prior to the collection of the download request. Upon identification of the non-requirement for the collection of the download request by the decision module, the download request collection module suspends the collection of the download request to at least a next preset timing.

When the predetermined condition for collection of the download request is unsatisfied at the download time, the information distribution control apparatus of the invention does not collect the download request from the another device and does not send the download requests to the server. The collection of the download request from the another device is suspended to a next download time. This arrangement desirably reduces the access frequency from the information distribution control apparatus or the device to the server.

In one preferable embodiment of the information distribution control apparatus of the invention, upon identification of the non-requirement for the collection of the download request by the decision module, the transmission module suspends the transmission of the download request stored in the download request storage module to the server to at least the next preset timing.

This arrangement further reduces the access frequency from the information distribution control apparatus to the server.

In one aspect of the invention, the information distribution control apparatus further includes a delayed collection request receiving module that receives a delayed collection request from the another device for suspending the collection of the download request. The predetermined condition includes a condition that a preset time has elapsed since the reception of the delayed collection request. The decision module identifies the non-requirement for the collection of the download request, when the preset time has not yet elapsed since the reception of the delayed collection request.

The preset time may be determined arbitrarily. When the download time is set to a periodical timing, the preset time may be identical with the period of the download time.

When the preset time has not yet elapsed at the download time since the reception of the delayed collection request from the another device, even in the presence of any download request for transmission, which is to be sent to the server, in the download request storage module, the information distribution control apparatus of this aspect determines that it is not the moment of collecting the download request from the another device and sending the download requests to the server. The collection of the download request from the another device and the transmission of the download requests to the server are thus suspended to a next download time. This arrangement desirably reduces the access frequency from the information distribution control apparatus to the server.

In another aspect of the invention, the information distribution control apparatus further includes a transmission request receiving module that receives the transmission request from the another device. The transmission module receives the transmission request from the another device and, in response to the received transmission request, sends back the download request stored in the download request storage module to the another device that has sent the transmission request. The predetermined condition includes a condition that a preset time has elapsed since the transmission of the download request. The decision module identifies the non-requirement for the collection of the download request, when the preset time has not yet elapsed since the transmission of the download request.

When the preset time has not yet elapsed at the download time since the previous transmission of the download request, even in the presence of any download request for transmission, which is to be sent to the server, in the download request storage module, the information distribution control apparatus of this aspect determines that it is not the moment of collecting the download request from the another device and sending the download requests to the server. The collection of the download request from the another device and the transmission of the download requests to the server are thus suspended to a next download time. This arrangement also desirably reduces the access frequency from the information distribution control apparatus to the server.

In one preferable embodiment of this aspect, the information distribution control apparatus further includes a reception complete response receiving module that receives a reception complete response, which represents completed reception of the download request, from either the server or the another device. The predetermined condition includes a condition that a preset time has elapsed since the reception of the reception complete response. The decision module identifies the non-requirement for the collection of the download request, when the preset time has not yet elapsed since the reception of the reception complete response.

When the preset time has not yet elapsed at the download time since the previous transmission of the download request and the subsequent reception of the reception complete response, even in the presence of any download request for transmission, which is to be sent to the server, in the download request storage module, the information distribution control apparatus of this embodiment determines that it is not the moment of collecting the download request from the another device and sending the download requests to the server. The collection of the download request from the another device and the transmission of the download requests to the server are thus suspended to a next download time. This arrangement also desirably reduces the access frequency from the information distribution control apparatus to the server.

In another preferable embodiment of this aspect, the information distribution control apparatus further includes: a deletion request receiving module that receives a deletion request from either the server or the another device for deletion of the sent download request stored in the download request storage module; and a download request deletion module that deletes the sent download request, in response to the received deletion request. The predetermined condition includes a condition that a preset time has elapsed since the deletion of the sent download request. The decision module identifies the non-requirement for the collection of the download request, when the preset time has not yet elapsed since the deletion of the sent download request.

When the preset time has not yet elapsed at the download time since the previous transmission of the download request and the subsequent reception of the deletion request for deletion of the sent download request, even in the presence of any download request for transmission, which is to be sent to the server, in the download request storage module, the information distribution control apparatus of this embodiment determines that it is not the moment of collecting the download request from the another device and sending the download requests to the server. The collection of the download request from the another device and the transmission of the download requests to the server are thus suspended to a next download time. This arrangement also desirably reduces the access frequency from the information distribution control apparatus to the server.

In another preferable embodiment of the information distribution control apparatus of the invention, the download request storage module stores the download request in correlation to timing information, which represents a storage timing of the download request. The predetermined condition includes a condition that the download request storage module has any download request for transmission, which was stored at least a preset time before and is to be sent to the server. The decision module refers to the timing information and identifies the non-requirement for the collection of the download request, when the download request storage module does not have any download request for transmission, which was stored at least the preset time before and is to be sent to the server.

When the download request storage module at the download time has no download request for transmission stored at least the preset time before, even in the presence of any download request for transmission, which is to be sent to the server, in the download request storage module, the information distribution control apparatus of this embodiment determines that it is not the moment of collecting the download request from the another device and sending the download requests to the server. The collection of the download request from the another device and the transmission of the download requests to the server are thus suspended to a next download time. This arrangement also desirably reduces the access frequency from the information distribution control apparatus to the server.

In the information distribution control apparatus of the invention having any of the above arrangements, the predetermined condition includes a condition that the download request storage module has any download request for transmission. The decision module identifies the non-requirement for the collection of the download request, when the download request storage module has no download request for transmission.

This arrangement increases the condition for collection of the download request and thereby further reduces the access frequency from the information distribution control apparatus to the server.

The technique of the invention is also attainable by application of a device.

The device of the invention is connected with a network and includes the information distribution control apparatus having any of the above arrangements.

The device of the invention desirably reduces the access frequency from the device to the server, like the information distribution control apparatus described above.

The technique of the invention is also attainable by application of an information distributing system.

The present invention is thus directed to an information distributing system including a first device, a second device, and a server that are mutually connected via a network.

The first device has a download request storage module that stores a download request for downloading specific information from the server. The first device determines at a preset timing whether any download request for transmission, which is to be sent to the server, is stored in the download request storage module, and upon determination of storage of the download request for transmission in the download request storage module, sends a transmission request to the second device for sending back a download request for transmission, which is to be sent to the server and is stored in the second device. The second device receives the transmission request and sends back the download request for transmission stored in the second device to the first device in response to the received transmission request. The first device sends the download request received from the second device and the download request stored in the download request storage module to the server. As a response to the download requests received from the first device, the server sends back specific information, which corresponds to the received download requests, to the first device. The first device distributes a relevant information part, which corresponds to the download request received from the second device among the specific information received from the server, to the second device.

In the information distributing system of the invention, both the first device, and the second device have the built-in information distribution control apparatus of the invention described above. When the download request storage module of one device (the first device) has storage of the download request for transmission, which is to be sent to the server, at the download time, the one device collects a download request for transmission from the another device (the second device). This lowers the probability of storage of any download request for transmission, which is to be sent to the server, in the download request storage module of the another device at the download time. When the download request for transmission that is to be sent to the server has already been collected by the one device and is thus not stored in the download request storage module of the another device, the another device does not collect the download request and does not send the download requests to the server at the download time. This arrangement effectively reduces the access frequency from the multiple devices to the server. In the information distributing system of the invention, the first device that collects the download request from the second device and sends the collected download requests to the server is not fixed but is changed over. Namely any device may function as the first device that collects the download request from the second device and sends the collected download requests to the server. This arrangement ensures transmission of the download request stored in the working device to the server.

The present invention is also directed to another information distributing system including a first device, a second device, and a server that are mutually connected via a network.

The first device sends a transmission request to the second device for sending back a download request stored in the second device. The second device receives the transmission request and sends back the download request stored in the second device to the first device in response to the received transmission request. The first device receives the download request from the second device and sends the download request received from the second device and a download request stored in the first device to the server. As a response to the download requests received from the first device, the server sends back specific information, which corresponds to the received download requests, to the first device. The first device sends the second device a relevant information part, which corresponds to the download request received from the second device among the specific information received from the server, and a delayed collection request for suspending collection of the download request. The second device determines at a preset timing whether a preset time has elapsed since reception of the delayed collection request. Upon determination that the preset time has elapsed since the reception of the delayed collection request, the second device sends a transmission request to the first device for sending back the download request stored in the first device. Upon determination that the preset time has not yet elapsed since the reception of the delayed collection request, the second device suspends transmission of the transmission request to at least a next preset timing.

This arrangement desirably reduces the access frequency from the second device to the server.

The present invention is further directed to another information distributing system including multiple devices and a server for distributing specific information to be used by each of the multiple devices, which are mutually connected via a network.

A specific device among the multiple devices sends a notification to another device other than the specific device to notify that the specific device collectively sends download requests for the specific information with regard to the multiple devices to the server. The another device receives the notification and successively sends a download request with regard to the another device to the specific device at a preset timing irrelevant to the specific device. The specific device sends a download request with regard to the specific device and the download request with regard to the another device received from the another device to the server at a specified timing. The server receives the download requests from the specific device and sends back the specific information corresponding to the received download requests to the specific server. The specific device receives the specific information from the server and distributes a relevant information part, which corresponds to the download request received from the another device among the received specific information, to the another device.

In the information distributing system of the invention, after reception of the notification that the specific device collectively sends the download requests for the specific information with regard to the multiple devices to the server, the another device successively sends a download request to the specific device at the preset timing irrelevant to the specific device. The 'preset timing irrelevant to the specific device' represents a timing free from the influence from the specific device or a timing determined by the another device alone. In the information distributing system including a large number of devices, this arrangement prevents simultaneous transmission of download requests from the large number of devices to the specific device. This arrangement thus restrains an abrupt increase in network traffic by transmission of the download requests from the other devices to the specific device.

The specific device collectively sends the download request with regard to the specific device and the download request with regard to the another device to the server at the specified timing. The 'specified timing' represents a timing set for transmission of the download requests to the server. This arrangement prevents the multiple devices from individually making access to the server and thus desirably reduces the access frequency from the respective devices to the server.

In the information distributing system where each of the multiple devices sends the download request to the server, this arrangement of the invention desirably reduces the access frequency from the respective devices to the server, while restraining an abrupt increase in network traffic by transmission of the download requests.

In the information distributing system of the invention, the 'specific device' is not fixed, but each of the multiple devices occasionally functions as the 'specific device' or as the 'another device'.

In the information distributing system of the invention, the preset timing may be any of various timings.

For example, the preset timing may be based on generation of the download request in the another device.

This arrangement enables a download request to be successively sent to the specific device whenever the download request is generated in the another device. The 'preset timing' may otherwise be a timing when a predetermined number of download requests are generated and accumulated in the another device.

In one aspect of the information distributing system of the invention, the multiple devices have identification information respectively allocated to the multiple devices for identification of the multiple devices. The another device sends the download request with regard to the another device in correlation to identification information for identifying the another device to the specific device. The specific device sends each download request in correlation to identification information corresponding to the each download request to the server.

The identification information may be, for example, a name, an MAC address, an IP address, or a production number allocated to each device. The identification information enables the server to readily identify the device sending each download request.

In another aspect of the information distributing system of the invention, after transmission of the download requests with regard to the multiple devices to the server, the specific device sends a deletion request to the another device for deleting the sent download request with regard to the another device. The another device receives the deletion request from the specific device and deletes the sent download request with regard to the another device in response to the received deletion request.

All the download requests stored in the another device are thus unsent download requests that have not yet been sent to the server. When functioning as the 'specific device, the another device can readily identify storage or non-storage of any unsent download request that has not yet been sent to the server.

The technique of the invention is also attainable by application of a device.

The present invention is thus directed to a device used for an information distributing system that includes multiple devices and a server for distributing specific information to be used by each of the multiple devices, which are mutually connected via a network.

The device includes: a receiving module that receives a notification from a specific device among the multiple devices to be notified that the specific device collectively sends download requests with regard to the multiple devices to the server; a download request generation module that generates a download request with regard to the device; and a transmission module that sends the generated download request to the specific device at a timing based on generation of the download request.

In the information distributing system including a large number of devices, this arrangement prevents simultaneous transmission of download requests from the large number of devices to the specific device. This arrangement thus restrains an abrupt increase in network traffic by transmission of the download requests to the specific device.

In one aspect of the device of the invention, the transmission module sends identification information for identifying the device in correlation to the download request to the specific device.

The identification information may be, for example, a name, an MAC address, an IP address, or a production number allocated to the device.

In one preferable embodiment of the invention, the device further has: a download request storage module that stores the generated download request; a deletion request receiving module that receives a deletion request from the specific device for deletion of the download request sent to the server; and a download request deletion module that deletes the download request that has been sent to the specific device and is stored in the download request storage module.

The device of this embodiment receives the deletion request from the specific device and deletes the sent download request that has already been sent from the specific device to the server.

All the various characteristics described above are not essential for application of the present invention, but part of such characteristics may be omitted or may be combined with another part of the characteristics. The technique of the invention is not restricted to the information distribution control apparatuses, the devices, or the information distributing systems described above, but may also be actualized by control methods of such information distribution control apparatuses, and control methods of such devices, and control methods of such information distributing systems. The present invention is attainable by diversity of other applications. The possible applications of the invention include computer programs that are executed to actualize the control methods of the information distribution control apparatuses, the devices, and the information distributing systems, recording media that record such computer programs therein, and data signals that include such computer programs and are embodied in carrier waves. Any of the various additional arrangements described above may be adopted in any of these applications.

In the applications of the invention as the computer programs and the recording media in which the computer programs are recorded, the invention may be given as a whole program for actualizing the control method of the information distribution control apparatus or the control method of the information distributing system or for controlling the operations of devices or as a partial program for exerting only the characteristic functions of the invention. Available examples of the recording media include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

BEST MODES FOR CARRYING OUT THE INVENTION

Some modes of carrying out the invention are described below in the following sequence as preferred embodiments with reference to the accompanied drawings:
A. First Embodiment
  A1. Configuration of Information Distributing System
  A2. Structure of Printer
  A3. Printer General Operation Flow
  A4. FTP Command Process
  A5. Download Process
B. Second Embodiment
C. Third Embodiment D. Fourth Embodiment
E. Fifth Embodiment
   E1. Structure of Printer
   E2. Printer General Operation Flow
   E3. File Collection Process
   E4. Download Process
F. Second Embodiment
G. Third Embodiment
H. Fourth Embodiment
I. Modifications

A. First Embodiment

A1. Configuration of Information Distributing System

Figure 1:
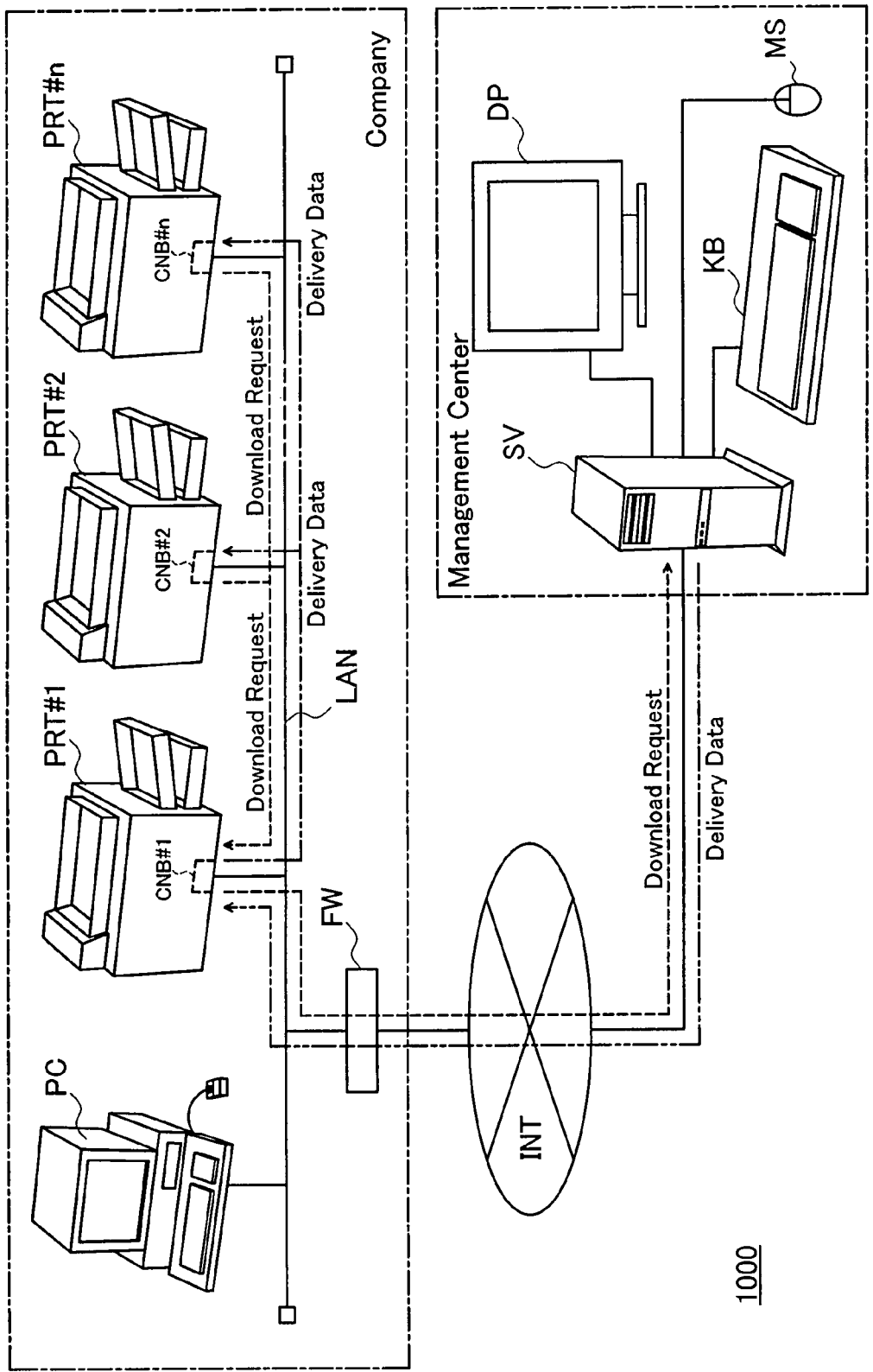
FIG. 1 schematically illustrates the configuration of an information distributing system 1000 in a first embodiment of the invention.

FIG. 1 schematically illustrates the configuration of an information distributing, system 1000 in a first embodiment of the invention. The information distributing system 1000 includes a management server SV in a management center and an intra-company local area network LAN that is connected to the management server SV via the Internet INT. There is a firewall FW provided between the local area network LAN and the Internet INT to prohibit accesses from the Internet INT to the local area network LAN. In the illustrated example of FIG. 1, there is only one local area network LAN connected to the management server SV. This number is, however, not restrictive and the number of local area networks connected to the management server SV may be set arbitrarily.

A personal computer PC and multiple printers PRT #1 through PRT #n are connected to the intra-company local area network LAN (hereafter the terminology 'printer PRT' may be used to collectively represent the printers PRT #1 through PRT #n). In the illustrated example of FIG. 1, there is only one personal computer PC connected to the intra-company LAN. This number is, however, not restrictive and the number of personal computers connected to the intra-company LAN may be set arbitrarily.

A word-processing software program and other application programs as well as printer drivers for controlling the operations of the printers PRT are installed in the personal computer PC. A print job output from the personal computer PC is transferred for printing to one of the printers PRT specified by the personal computer PC.

The printers PRT #1 through PRT #n respectively have built-in custom network boards CNB #1 through CNB #n (hereafter the terminology 'custom network board CNB' may be used to collectively represent the custom network boards CNB #1 through CNB #n). The custom network board CNB is a network interface for transmission of print jobs, download requests (described later), and various data including delivery data in response to the download requests via the local area network LAN and the Internet INT. The custom network board CNB is equivalent to the information distribution control apparatus of the invention.

The custom network board CNB also has the functions of monitoring the operations of the corresponding printer PRT with regard to each print job and notifying the management server SV of monitor information as the monitoring result. These functions are not characteristic of the present invention and are thus not explained here in detail. The monitor information includes diversity of log data, for example, the number of printed copies, the amount of consumed toner, and error information.

The management server SV in the management center stores the monitor information received from the built-in custom network boards CNB of the printers PRT into a database (not shown). The management server SV stores delivery data to be distributed to the respective printers PRT, for example, latest programs and data to be used by the respective printers PRT. The management server SV has the function of receiving a download request from each printer PRT and sending required delivery data as a response to the download request to the printer PRT as the sender of the download request. The delivery data is sent in the file format. Hereafter the delivery data sent from the management server SV in response to the download request may also be referred to as download data or download data file. The management server SV is connected to a display DP, a mouse MS, and a keyboard KB. The system manager operates these peripheral devices to browse the monitor information stored in the database and perform various settings for management of the respective printers PRT.

The following describes the general operations of the information distributing system 1000 of the embodiment. A download time is set in the custom network board CNB of each printer PRT for sending a download request of delivery data to the management server SV to receive download data from the management server SV. In this embodiment, different download times are set in the respective custom network boards CNB. A waiting time for a first download time since the power supply of each printer PRT and a periodical downloading cycle are set in each printer PRT. The download is repeated periodically. The download time may be set in advance in each printer PRT or may be set manually by the user. The download time may otherwise be set automatically with random digits or may be specified by and downloaded from the management server SV.

When the download time comes in a certain printer PRT, the certain printer PRT identifies requirement or non-requirement for sending download requests to the management server SV. Upon requirement for sending the download requests, the certain printer PRT sends a transmission request to the other printers PRT for transmission of download requests stored in the other printers PRT. The certain printer PRT collects the download requests sent back from the other printers PRT as the responses to the transmission request and sends the download request stored in the certain printer PRT and the collected download requests to the management server SV. Each download request includes an inquiry to the management server SV about the presence of any latest program or data to be downloaded in the management server SV and a request for downloading the latest program and data. The printer PRT as the sender of the download requests to the management server SV downloads required download data as the response to the download requests from the management server SV and distributes the download data to the other printers PRT as the collection sources of the download requests. In the information distributing system 1000 of this embodiment, the printer PRT for collecting the download requests from the other printers PRT and sending the collected download requests to the management server SV is not fixed but is changed over according to the operating statuses of the respective printers PRT. In the description hereafter, the printer PRT that collects the download requests from the other printers PRT and sends the collected download requests to the management server SV is referred to as the 'representative printer'. Each printer PRT that sends back the download request to the representative printer in response to the transmission request is referred to as the 'represented printer'. In the illustrated example, the arrows of broken line and the arrows of two-dot chain line respectively show the flows of download requests and the flows of delivery data when the printer PRT #1 functions as the representative printer. The details of these operations will be described later.

A2. Structure of Printer

Figure 2:
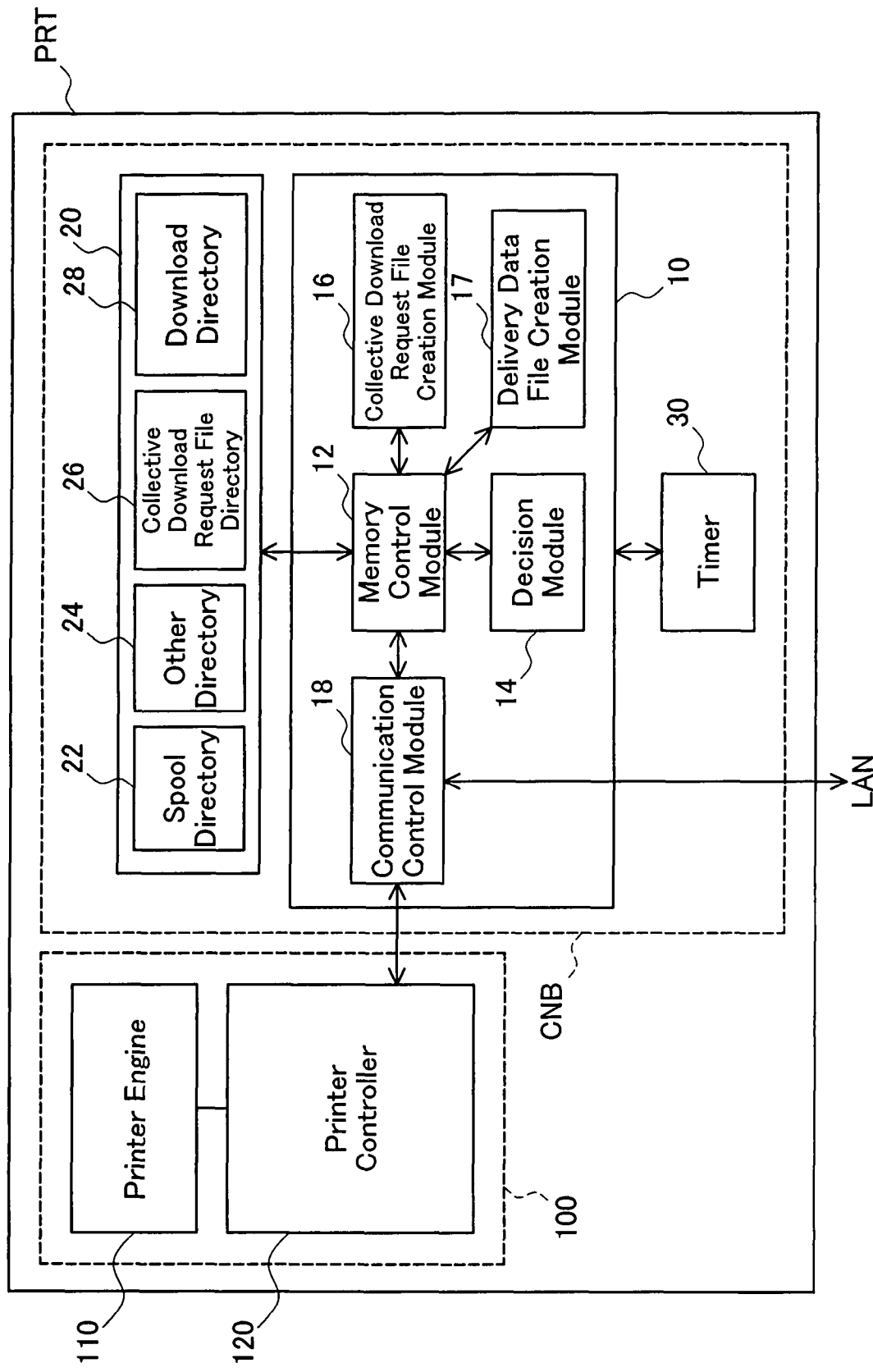
FIG. 2 shows the structure of a printer PRT.

FIG. 2 shows the structure of the printer PRT. The printer PRT includes a printer main body 100 that performs actual printing operations and a custom network board CNB. The printer main body 100 has a printer engine 110 and a printer controller 120.

The printer controller 120 is a computer including a CPU, a RAM, and a ROM (not shown). The printer controller 120 receives a print job from the personal computer PC via the custom network bard CNB and controls the printer engine 110 to perform a printing operation. The printer controller 120 has a non-illustrated monitor module for collecting various pieces of monitor information with regard to the printer main body 100 and storing the collected pieces of monitor information in the format of an MIB (management information base). The MIB includes general pieces of information commonly defined by the standard and specific pieces of information uniquely defined by the manufacturer. The printer controller 120 also has the function of receiving and updating the latest program and data included in the download data sent from the management server SV or from another printer PRT to the custom network board CNB.

The custom network board CNB has a CPU 10, a memory 20, and a timer 30. The memory 20 includes both a volatile memory and a nonvolatile memory. The CPU 10 includes a memory control module 12, a decision module 14, a collective download request file creation module 16, a delivery data file creation module 17, and a communication control module 18. The CPU 10 reads and executes preset computer programs stored in a ROM (not shown) to attain these functional blocks by the software. At least part of these functional blocks may alternatively be actualized by the hardware elements.

The memory control module 12 controls operations of writing, reading, and deleting various data into and from the memory 20. As described later in detail, the data stored in the memory 20 include download request files recording own download requests to the management server SV, download request files collected from the other printers PRT, a collective download request file to be sent to the management server SV, and a download data file downloaded from the management server SV. The memory 20 and the memory control module 12 are equivalent to the download request storage module, the identification information storage module, the download request deletion module, and the information storage module of the invention.

The decision module 14 makes decisions with regard to a printer general operation flow, an FTP command process, and a download process described later. The decision module 14 is equivalent to the decision module of the invention.

The collective download request file creation module 16 combines the download request files stored in a spool directory 22 set in the memory 20 with the download request files stored in an 'other' directory 24 set in the memory 20 and creates a collective download request file to be sent to the management server SV. Namely the collective download request file collectively records one or multiple download requests. The collective download request file creation module 16 is equivalent to the download request file creation module of the invention.

The delivery data file creation module 17 analyzes the contents of a download data file collectively downloaded from the management server SV, divides the download data file into to delivery data for the respective printers PRT, and creates delivery data files recording the delivery data to be distributed to the respective printers PRT.

The communication control module 18 changes over an effective communication protocol corresponding to each communication partner and establishes communication with the personal computer PC, the other printers PRT, and the management server SV via the local area network LAN and the Internet INT. The communication control module 18 sends and receives data to and from the printer controller 120. The communication control module 18 is equivalent to the download request collection module, the transmission module, the receiving module, the transmission request receiving module, and the deletion request receiving module of the invention.

The timer 30 counts the time elapsed since the power supply of the printer PRT. In the structure of this embodiment, the timer 30 counts the frequency of power supply, as well as the time elapsed since each power-on operation of the printer PRT.

The memory 20 includes the spool directory 22, the 'other' directory 24, a collective download request file directory 26, and a download directory 28. The spool directory 22 stores own download requests in the file format. The 'other' directory 24 stores download request files collected from the other printers PRT. The collective download request file directory 26 stores a collective download request file created by the collective download request file creation module 16. The collective download request file is sent to the management server SV. The download directory 28 stores a download data file downloaded from the management server SV.

Figure 3:
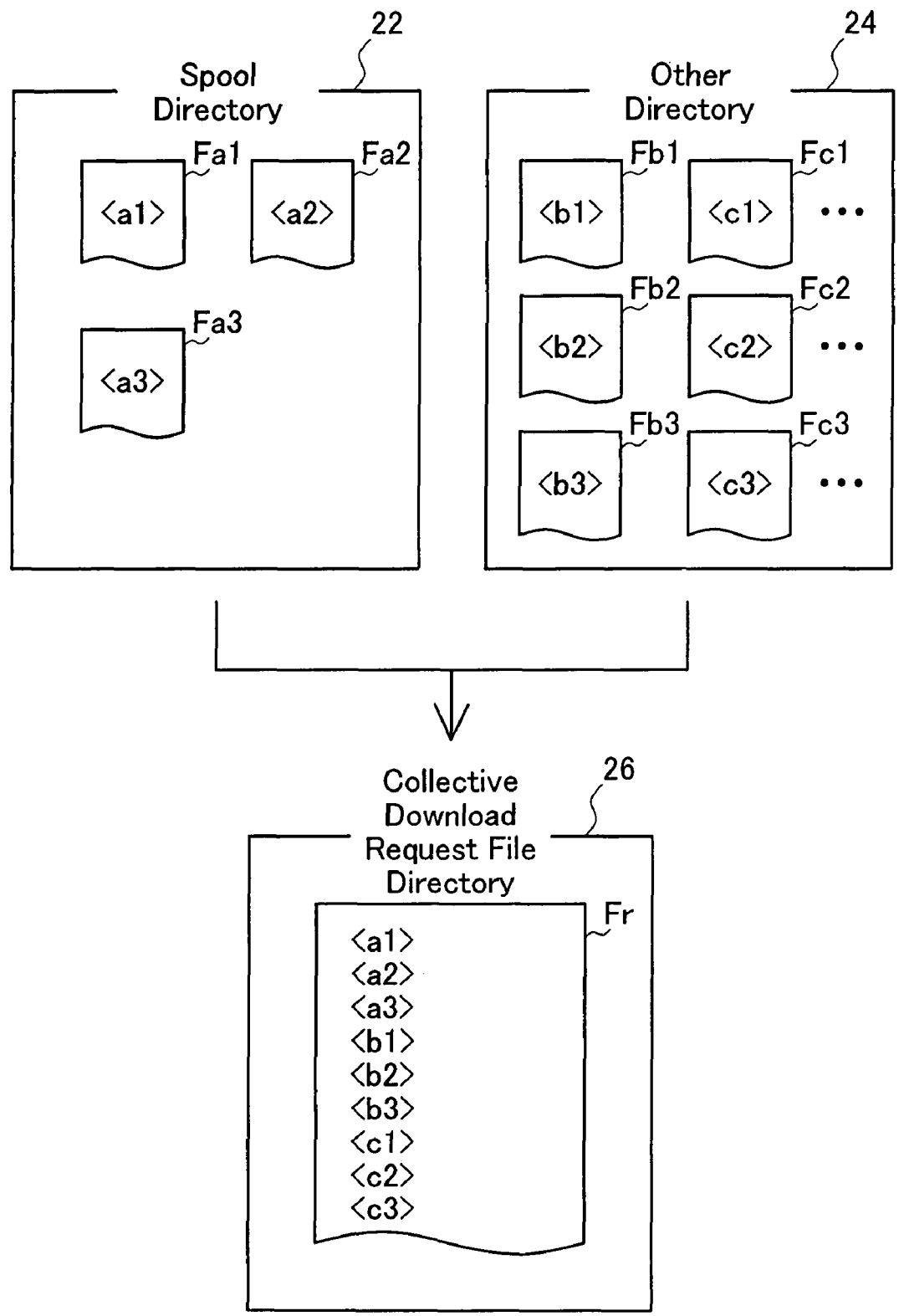
FIG. 3 shows creation of a collective download request file.

FIG. 3 shows creation of the collective download request file. In the illustrated example, the spool directory 22 stores download request files Fa1, Fa2, and Fa3, and the 'other' directory 24 stores collected download request files, for example, Fb1, Fb2, Fb3, Fc1, Fc2, Fc3. Each download request includes an inquiry to the management server SV about the presence of any latest program or data to be downloaded in the management server SV and a request for downloading the latest program and data as explained above. Each download request file stores identification information of the relevant printer PRT, as well as the download request. The identification information may be, for example, a name, an MAC address, an IP address, or a production number allocated to each printer PRT. Each download request file also stores the time when the download request file was created and stored into the memory 20.

In the illustrated example, the collective download request file creation module 16 combines the download request files Fa1, Fa2, Fa3 with the download request files Fb1, Fb2, Fb3, Fc1, Fc2, Fc3, . . . , creates a collective download request file Fr, and stores the created collective download request file Fr into the collective download request file directory 26. Creation of this collective download request file enables simultaneous transmission of the download requests of the multiple printers PRT to the management server SV and thereby controls the network traffic. Each download request file includes the identification information of the relevant printer PRT. The management server SV analyzes the contents of the received collective download request file Fr and readily identifies the printer PRT outputting each download request file.

Figure 4:
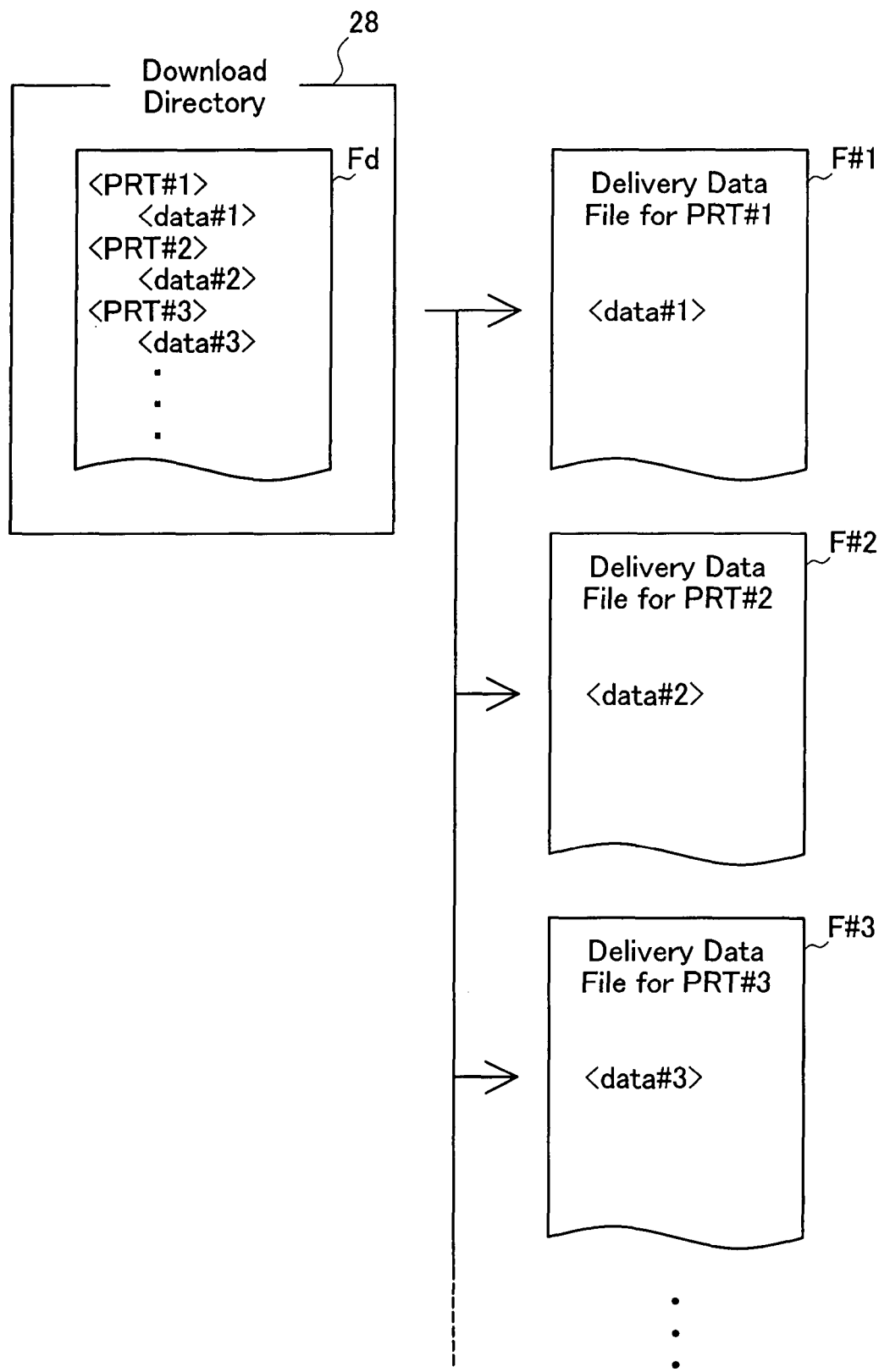
FIG. 4 shows creation of delivery data files.

FIG. 4 shows creation of delivery data files. The download directory 28 stores a download data file Fd downloaded from the management server SV. In the illustrated example, the download data file Fd collectively records, for example, data #1 as data for the printer PRT #1, data #2 as data for the printer PRT #2, and data #3 as data for the printer PRT #3 corresponding to the respective download requests recorded in the collective download request file Fr. Each of such data includes the name of each program file to be downloaded, the name of a data file to be downloaded, each program, and data. The delivery data file creation module 17 analyzes the contents of the download data file Fd, divides the download data file Fd into delivery data for the respective printers PRT, and creates delivery data files, for example, a delivery data file F #1 for the printer PRT #1 recording data #1 as the data for the printer PRT #1, a delivery data file F #2 for the printer PRT #2 recording data #2 as the data for the printer PRT #2, and a delivery data file F #3 for the printer PRT #3 recording data #3 as the data for the printer PRT #3.

A3. Printer General Operation Flow

Figure 5:
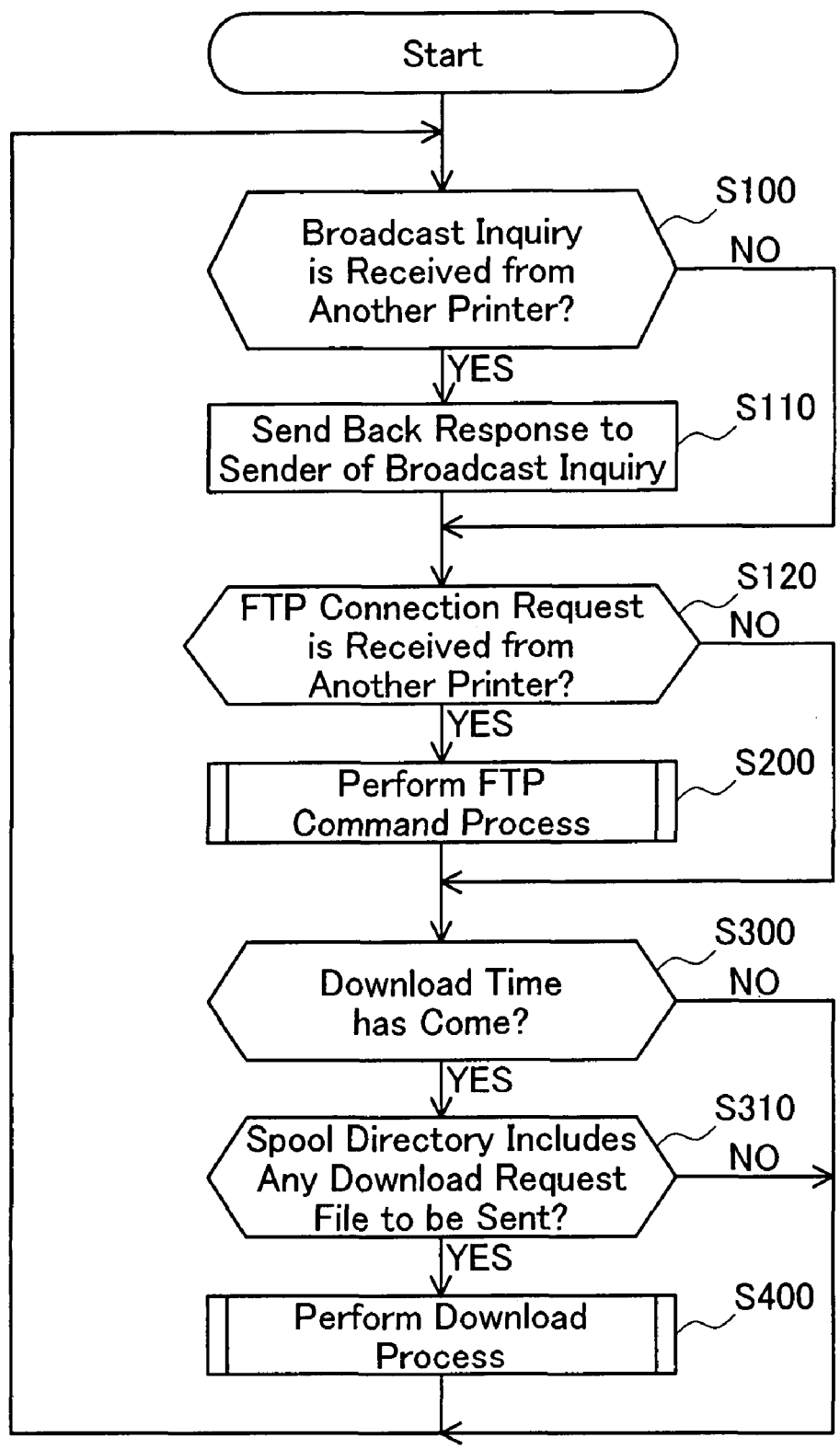
FIG. 5 is a flowchart showing a general operation flow of the printer PRT.

FIG. 5 is a flowchart showing a general operation flow of the printer PRT. The general operation flow starts in response to a power-on operation and is continually performed until a power-off operation by the CPU 10 of the custom network board CNB in each printer PRT.

The CPU 10 first determines whether a broadcast inquiry for confirmation of the presence is received from another printer or the representative printer (step S100). In response to reception of the broadcast inquiry (step S100: yes), the CPU 10 specifies the self printer PRT as a represented printer and sends a response representing the confirmed presence to the representative printer as the sender of the broadcast inquiry (step S110). In the case of no reception of the broadcast inquiry from the representative printer (step S100: no), on the other hand, the general operation flow goes to step S120.

The CPU 10 subsequently determines whether an FTP connection request is received from another printer or the representative printer (step S120). In response to reception of the FTP connection request from the representative printer (step S120: yes), the CPU 10 executes an FTP command process according to a received FTP command (step S200). On completion of the FTP command process, the role of the printer PRT as the represented printer is completed. The FTP command process will be described later in detail. In the case of no reception of the FTP connection request from the representative printer (step S120: no), on the other hand, the general operation flow goes to step S300.

The CPU 10 then refers to the timer 30 and determines whether the download time has come (step S300). When the download time has not yet come (step S300: no), the general operation flow returns to step S100. When the download time has come (step S300: yes), on the other hand, the CPU 10 determines whether the spool directory 22 stores any download request file to be sent to the management server SV (step S310). When the spool directory 22 includes any download request file to be sent to the management server SV (step S310: yes), the CPU 10 specifies the self printer PRT as the representative printer and performs the down process (step S400). On completion of the download process, the role of the self printer PRT as the representative printer is completed, and the general operation flow returns to step S100. When the spool directory 22 includes no download request file to be sent to the management server SV (step S310: no), on the other hand, the general operation flow returns to step S100 without specifying the self printer PRT as the representative printer and performing the download process.

A4. FTP Command Process

Figure 6:
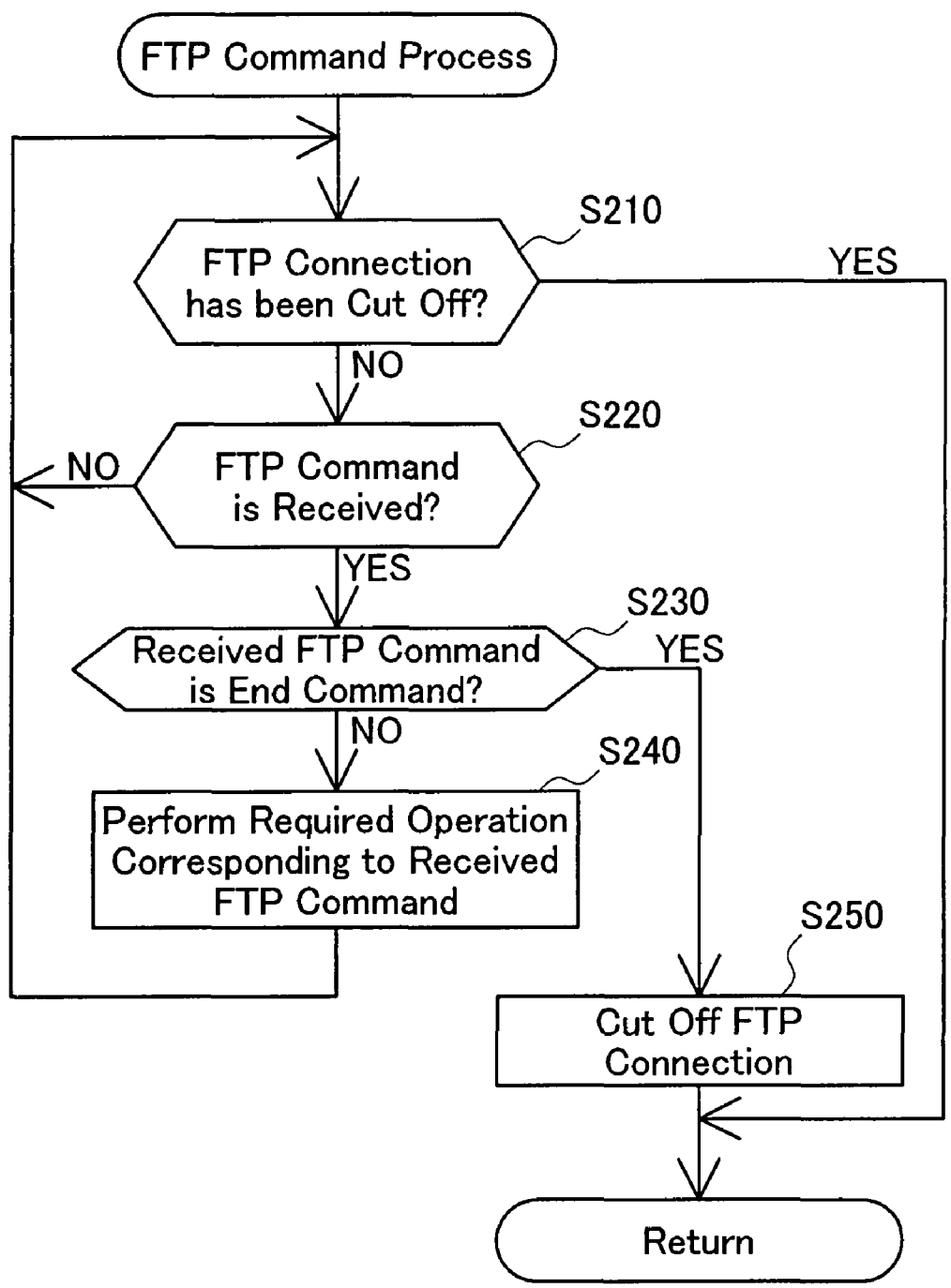
FIG. 6 is a flowchart showing the details of an FTP command process.

FIG. 6 is a flowchart showing the details of the FTP command process executed at step S200 in the general operation flow of FIG. 5. The FTP command process is performed by the CPU 10 of the represented printer.

The CPU 10 of the represented printer first determines whether an FTP connection with the representative printer has been cut off (step S210). In the event of cutoff of the FTP connection (step S210: yes), the FTP command process is immediately terminated without any further processing.

In the case of no cutoff of the FTP connection (step S210: no), the CPU 10 subsequently determines whether an FTP command is received from the representative printer (step S220). In the case of no reception of the FTP command from the representative printer (step S220: no), the CPU 10 waits until reception of the FTP command.

In response to reception of the FTP command from the representative printer (step S220: yes), the CPU 10 identifies whether the received FTP command is an end command (step S230). When the FTP command received from the representative printer is not the end command (step S230: no), the CPU 10 performs a required operation corresponding to the received FTP command (step S240). The required operation is, for example, transfer of download request files or deletion of download request files as described later in detail. On completion of the required operation, the FTP command process goes back to step S210. When the FTP command received from the representative printer is the end command (step S230: yes), on the other hand, the CPU 10 cuts off the FTP connection with the representative printer (step S250) and exits from the FTP command process. The role of the represented printer is completed at this moment.

A5. Download Process

Figure 7:
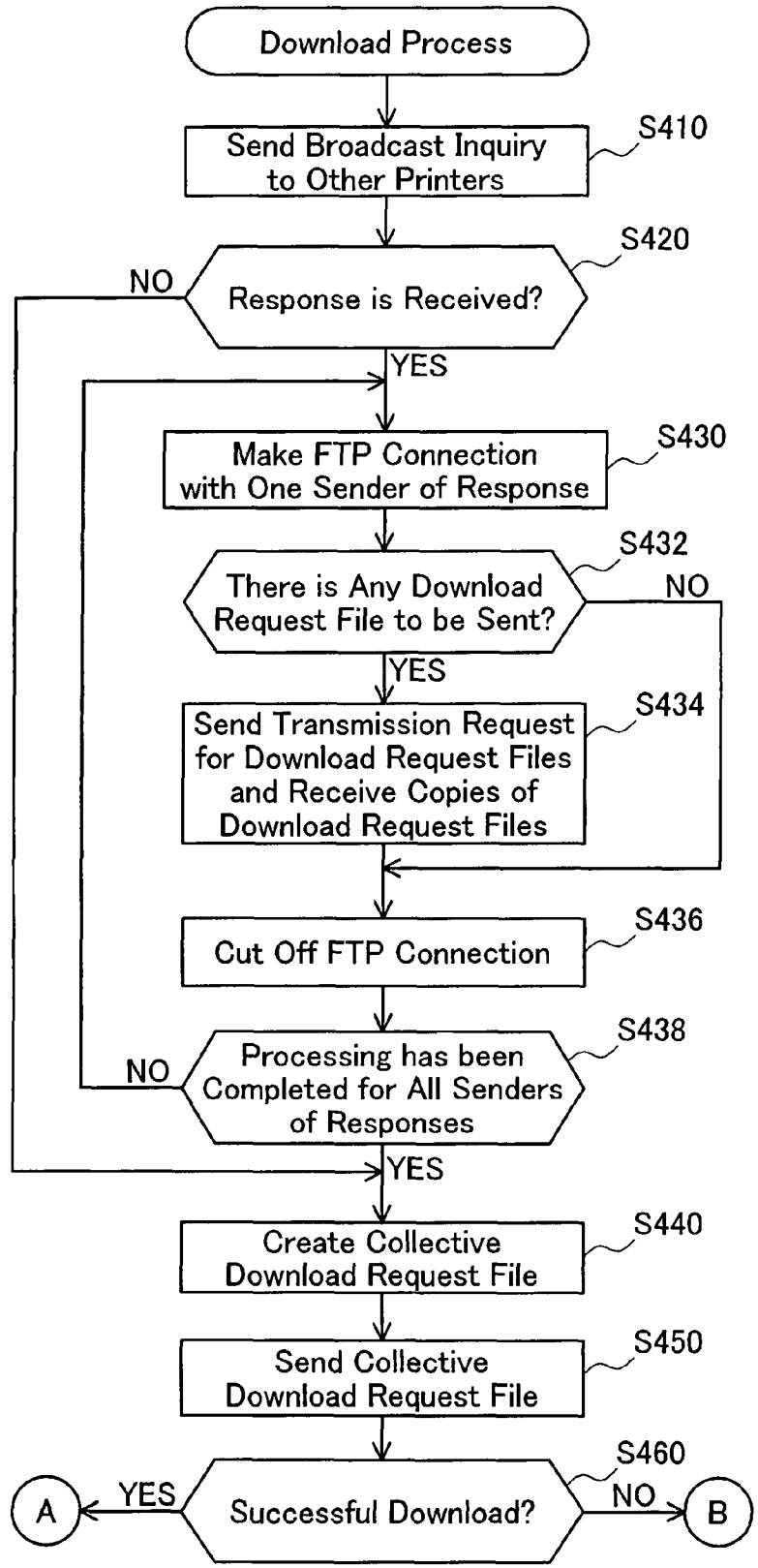
FIG. 7 is a flowchart showing the details of a download process.
Figure 8:
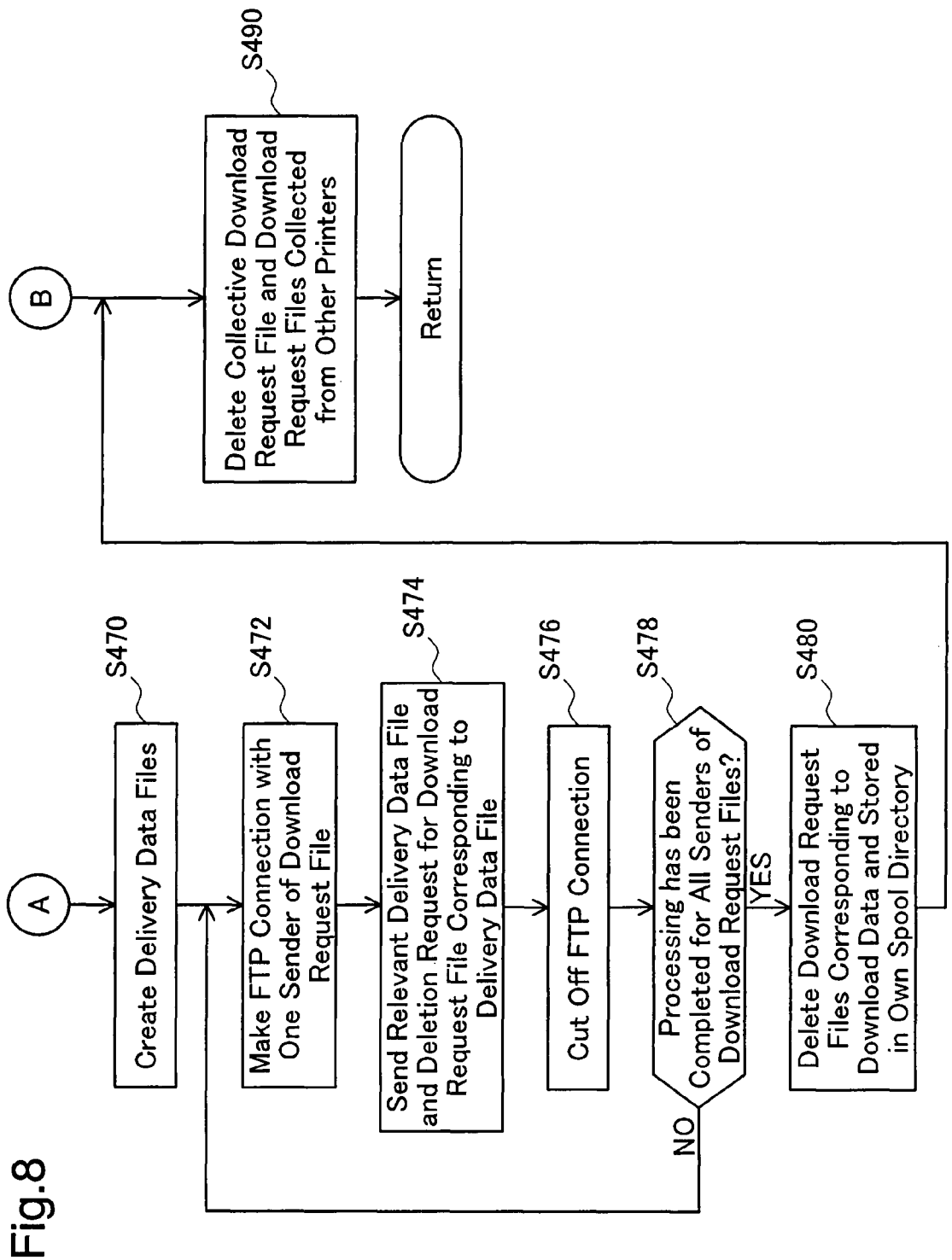
FIG. 8 is a flowchart showing the details of the download process.

FIGS. 7 and 8 are flowcharts showing the details of the download process executed at step S400 in the general operation flow of FIG. 5. The download process is performed by the CPU 10 of the representative printer.

The CPU 10 of the representative printer sends a broadcast inquiry for confirmation of the presence to all the other printers PRT, that is, all the represented printers connected to the local area network LAN (step S410). The CPU 10 then determines whether a response to the broadcast inquiry is received from any of the represented printers (step S420). In the case of no reception of any response to the broadcast inquiry from any of the represented printers (step S420: no), the CPU 10 identifies the absence of any represented printer as an object of collection of download request files and combines only the download request files stored in the spool directory 22 to create a collective download request file Fr (step S440). The created collective download request file Fr is stored into the collective download request file directory 26, is compressed, and is sent to the management server SV (step S450). The transmission of the collective download request file Fr to the management server SV adopts the SSL (Secure Socket Layer) standard for the enhanced security.

In the event of reception of any response to the broadcast inquiry from any of the represented printers (step S420: yes), on the other hand, the CPU 10 makes an FTP connection with one of the represented printers as senders of the responses to the broadcast inquiry (step S430) and sends an inquiry to the FTP-connected represented printer about the presence of any download request file to be sent to the management server SV (step S432). When the FTP-connected represented printer has any download request file to be sent to the management server SV (step S432: yes), the CPU 10 sends a transmission request for all the download request files and receives copies of all the object download request files (step S434). The received copies of the download request files are stored into the 'other' directory 24. The CPU 10 subsequently cuts off the FTP connection (step S436). When the FTP-connected represented printer has no download request file to be sent to the management server SV (step S432: no), on the other hand, the CPU 10 immediately cuts off the FTP connection without any further processing (step S436).

The CPU 10 determines whether the processing of steps S430 to S436 has been completed for all the represented printers as the senders of the responses to the broadcast inquiry (step S438). When there is any represented printer that has not yet been the target of the processing of steps S430 to S436 (step S438: no), the download process goes back to step S430. When the processing of steps S430 to S436 has been completed for all the represented printers as the senders of the responses to the broadcast inquiry (step S438: yes), on the other hand, the CPU 10 combines the download request files stored in the spool directory 22 with the download request files stored in the 'other' directory 24 to create a collective download request file Fr (step S440). The created collective download request file Fr is stored into the collective download request file directory 26, is compressed, and is sent to the management server SV (step S450).

The CPU 10 then identifies successful download or failed download (step S460). This identification is based on reception of a download data file from the management server SV. In the event of reception of the download data file from the management server SV, the CPU 10 identifies successful download. In the event of no reception of the download data file from the management server SV, on the contrary, the CPU 10 identifies failed download.

In the case of successful download (step S460: yes), the CPU 10 creates delivery data files (step S470). The CPU 10 then makes an FTP connection with one of the represented printers as the senders of the download request files received at step S434 (step S472) and sends a relevant one of the created delivery data files and a deletion request for deletion of the collected download request file corresponding to the relevant delivery data file to the FTP-connected represented printer (step S474). The FTP-connected represented printer receives the relevant delivery data file and the deletion request, performs a required series of processing corresponding to the contents of the received delivery data file, and deletes the corresponding download request file in response to the received deletion request. This leaves only unsent download request files, which have not yet been sent to the management server SV, in the spool directory 22 of the represented printer. This arrangement enables the CPU 10 to readily identify the presence of any unsent download request file in the spool directory 22.

The CPU 10 then cuts off the FTP connection with the represented printer (step S476).

The CPU 10 determines whether the processing of steps S472 and S474 has been completed for all the represented printers as the senders of the download request files (step S478). When there is any represented printer that has not yet been the target of the processing of steps S472 and S474 (step S478: no), the download process goes back to step S472. When the processing of steps S472 and S474 has been completed for all the represented printers as the senders of the download request files (step S478: yes), on the other hand, the CPU 10 deletes the download request files, which correspond to the download data and are stored in the own spool directory 22 (step S480). The CPU 10 successively deletes the collective download request file Fr stored in the collective download request file directory 26 and the download request files collected from the represented printers and stored in the 'other' directory 24 (step S490).

In the event of failed download (step S460: no), on the other hand, the CPU 10 deletes the collective download request file Fr stored in the collective download request file directory 26 and the download request files collected from the represented printers and stored in the 'other' directory 24 (step S490), while keeping the download request files stored in the spool directory 22 until execution of the download process by any printer PRT. The CPU 10 then terminates the download process.

In the information distributing system 1000 of the first embodiment described above, when the spool directory 22 has any unsent download request file that has not yet been sent to the management server SV at the download time, the printer PRT functions as the representative printer that collects the download request files from the other printers PRT and sends the collected download request files with the unsent download request files stored in the own spool directory 22 to the management server SV. When the spool directory 22 has no unsent download request file that has not yet been sent to the management server SV at the download time, the printer PRT does not function as the representative printer that collects the download request files from the other printers PRT and downloads the download data file from the management server SV. This arrangement desirably reduces the access frequency from the respective printers PRT to the management server SV.

In the information distributing system 1000 of the first embodiment, the representative printer is not fixed but any of the multiple printers PRT may function as the representative printer. The printer PRT specified as the representative printer collects download requests from all the other printers PRT specified as the represented printers and sends the collected download requests with the own download requests to the management server SV.

B. Second Embodiment

An information distributing system 1000 of a second embodiment has the same configuration as that of the information distributing system 1000 of the first embodiment. Each printer PRT in the second embodiment has the same structure as that of the printer PRT in the first embodiment. The processing executed by the CPU 10 of the custom network board CNB attached to the printer PRT of the second embodiment is partially different from the processing executed by the printer PRT of the first embodiment. The following describes the difference from the first embodiment.

Figure 9:
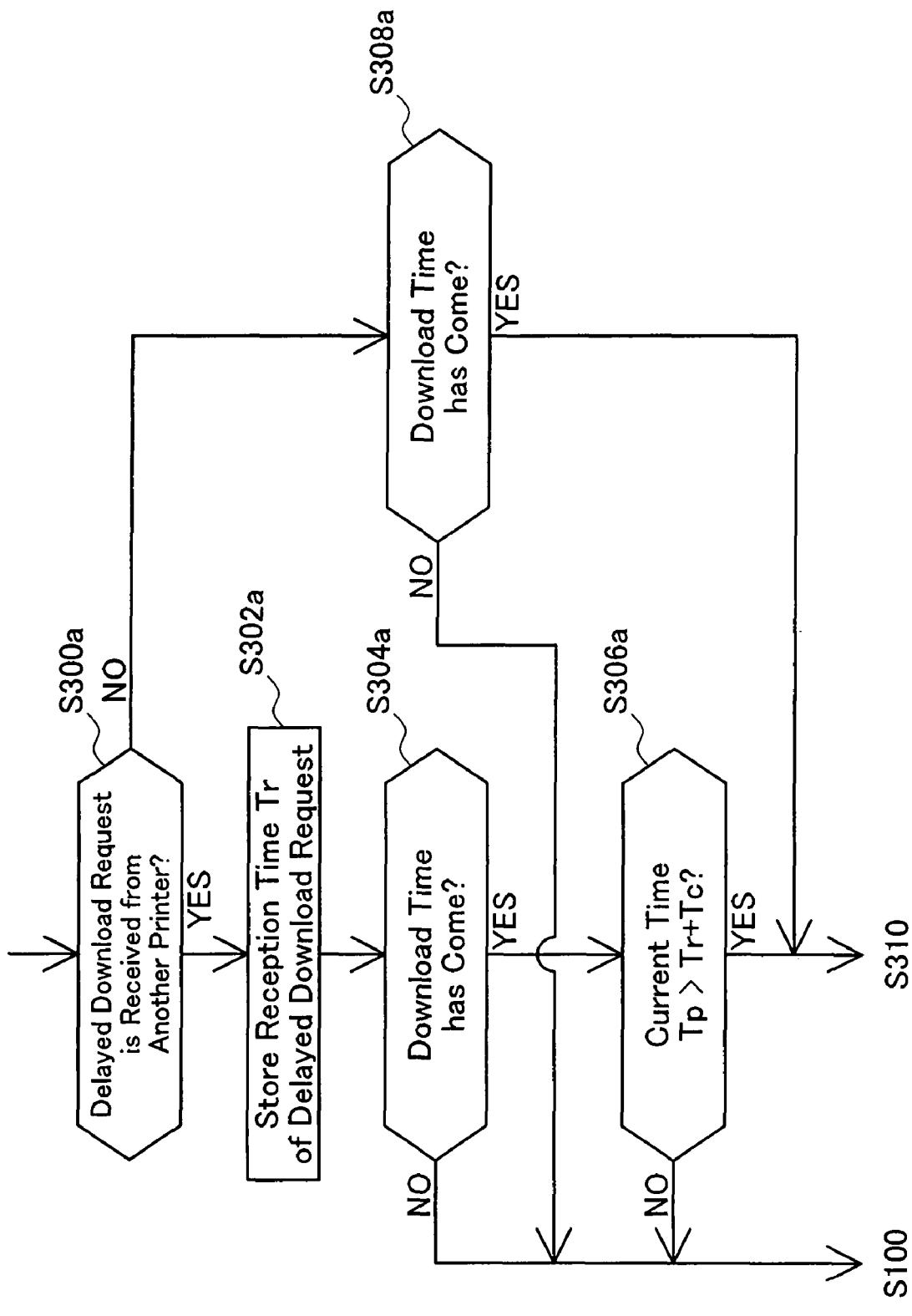
FIG. 9 is a flowchart showing a general operation flow of the printer PRT executed in a second embodiment.

FIG. 9 is a flowchart showing a general operation flow of the printer PRT executed in the second embodiment. The processing flow of FIG. 9 is executed instead of the processing of step S300 in the general operation flow of the first embodiment (see FIG. 5). In the second embodiment, the representative printer sends a delayed download request to the represented printers in the case of successful download of the download data file from the management server SV as described below.

The CPU 10 identifies reception or no reception of a delayed download request from another printer or the representative printer (step S300a). In the case of reception of the delayed download request (step S300a: yes), the CPU 10 refers to the timer 30 and stores a reception time Tr of the delayed download request into the memory 20 (step S302a).

The CPU 10 then refers to the timer 30 and determines whether the download time has come (step S304a). When the download time has not yet come (step S304a: no), the general operation flow returns to step S100 in the flowchart of FIG. 5. When the download time has come (step S304a: yes), on the other hand, the CPU 10 determines whether a current time Tp is after elapse of a preset time Tc from the reception time Tr of the delayed download request (step S306*a*). The preset time Tc may be determined arbitrarily. When the current time Tp is not after elapse of the preset time Tc from the reception time Tr of the delayed download request (step S306*a*: no), the general operation flow returns to step S100 in the flowchart of FIG. 5. When the current time Tp is after elapse of the preset time Tc from the reception time Tr of the delayed download request (step S306*a*: yes), on the other hand, the general operation flow goes to step S310 in the flowchart of FIG. 5.

In the case of no reception of the delayed download request from the representative printer (step S300*a*: no), the CPU 10 refers to the timer 30 and determines whether the download time has come (step S308*a*). When the download time has not yet come (step S308*a*: no), the general operation flow returns to step S100 in the flowchart of FIG. 5. When the download time has come (step S308*a*: yes), the general operation flow goes to step S310 in the flowchart of FIG. 5.

Figure 10:
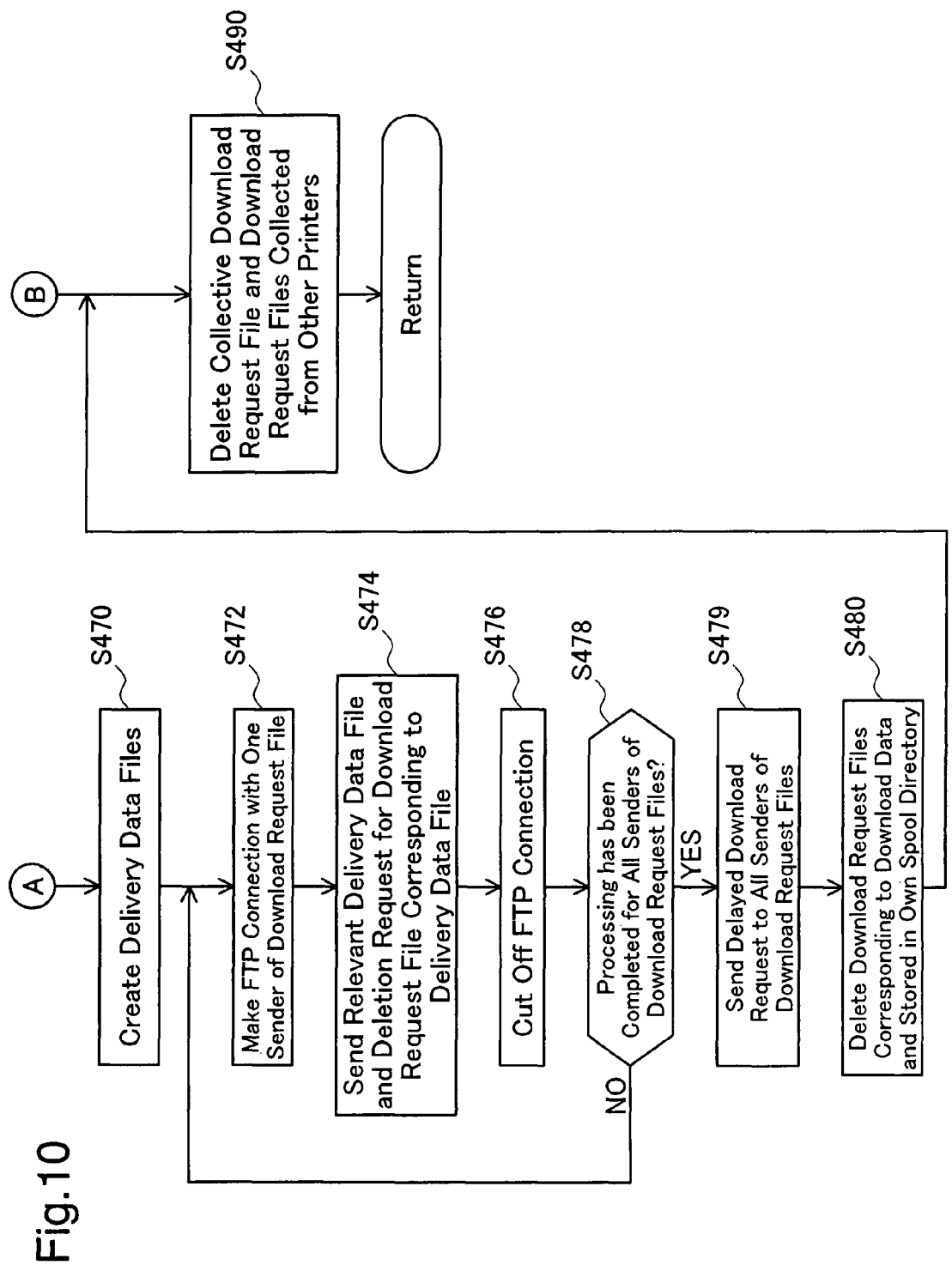
FIG. 10 is a flowchart showing the details of a download process executed in the general operation flow of the second embodiment.

FIG. 10 is a flowchart showing a download process executed in the second embodiment. The download process of the second embodiment includes a partly different processing flow after step S460 from the download process of the first embodiment (see FIGS. 7 and 8). Specifically the download process of the second embodiment has step S479 between step S478 and step S480 in the flowchart of FIG. 8. Otherwise the download process of the second embodiment is identical with the download process of the first embodiment.

In the case of successful download (step S460: yes) in the flowchart of FIG. 7, the CPU 10 creates delivery data files (step S470). The CPU 10 then makes an FTP connection with one of the represented printers as the senders of the download request files received at step S434 (step S472) and sends a relevant one of the created delivery data files and a deletion request for deletion of the collected download request file corresponding to the relevant delivery data file to the FTP-connected represented printer (step S474). The FTP-connected represented printer receives the relevant delivery data file and the deletion request, performs a required series of processing corresponding to the contents of the received delivery data file, and deletes the corresponding download request file in response to the received deletion request.

The CPU 10 then cuts off the FTP connection with the represented printer (step S476).

The CPU 10 determines whether the processing of steps S472 and S474 has been completed for all the represented printers as the senders of the download request files (step S478). When there is any represented printer that has not yet been the target of the processing of steps S472 and S474 (step S478: no), the download process goes back to step S472. When the processing of steps S472 and S474 has been completed for all the represented printers as the senders of the download request files (step S478: yes), on the other hand, the CPU 10 sends the delayed download request to all the represented printers as the senders of the download request files (step S479). When the download time set in each represented printer has come, the represented printer determines specification or non-specification as the representative printer in response to the received delayed download request.

The CPU 10 then deletes the download request files, which correspond to the download data and are stored in the own spool directory 22 (step S480). The CPU 10 successively deletes the collective download request file Fr stored in the collective download request file directory 26 and the download request files collected from the represented printers and stored in the 'other' directory 24 (step S490).

In the event of failed download (step S460: no), on the other hand, the CPU 10 deletes the collective download request file Fr stored in the collective download request file directory 26 and the download request files collected from the represented printers and stored in the 'other' directory 24 (step S490), while keeping the download request files stored in the spool directory 22 until execution of the download process by any printer PRT. The CPU 10 then terminates the download process.

In the information distributing system 1000 of the second embodiment described above, when the preset time Tc has not yet elapsed at the download time since reception of the delayed download request from the representative printer, even in the presence of any unsent download request file, which has not yet been sent to the management server SV, in the spool directory 22, the printer PRT determines that it is not the moment of collecting the download request files from the other printers PRT and sending the collected download request files with the unsent download request files to the management server SV. The printer PRT accordingly does not function as the representative printer but suspends the collection of the download request files from the other printers PRT and the download of the download data file from the management server SV until a next download time. The information distributing system 1000 of the second embodiment preferably uses only one printer PRT as the representative printer to the maximum possible extent and prevents the multiple printers PRT from individually performing the download process. This arrangement further reduces the access frequency from the respective printers PRT to the management server SV, compared with the information distributing system 1000 of the first embodiment.

C. Third Embodiment

An information distributing system 1000 of a third embodiment has the same configuration as that of the information distributing system 1000 of the first embodiment. Each printer PRT in the third embodiment has the same structure as that of the printer PRT in the first embodiment. The processing executed by the CPU 10 of the custom network board CNB attached to the printer PRT of the third embodiment is partially different from the processing executed by the printer PRT of the first embodiment. The following describes the difference from the first embodiment.

Figure 11:
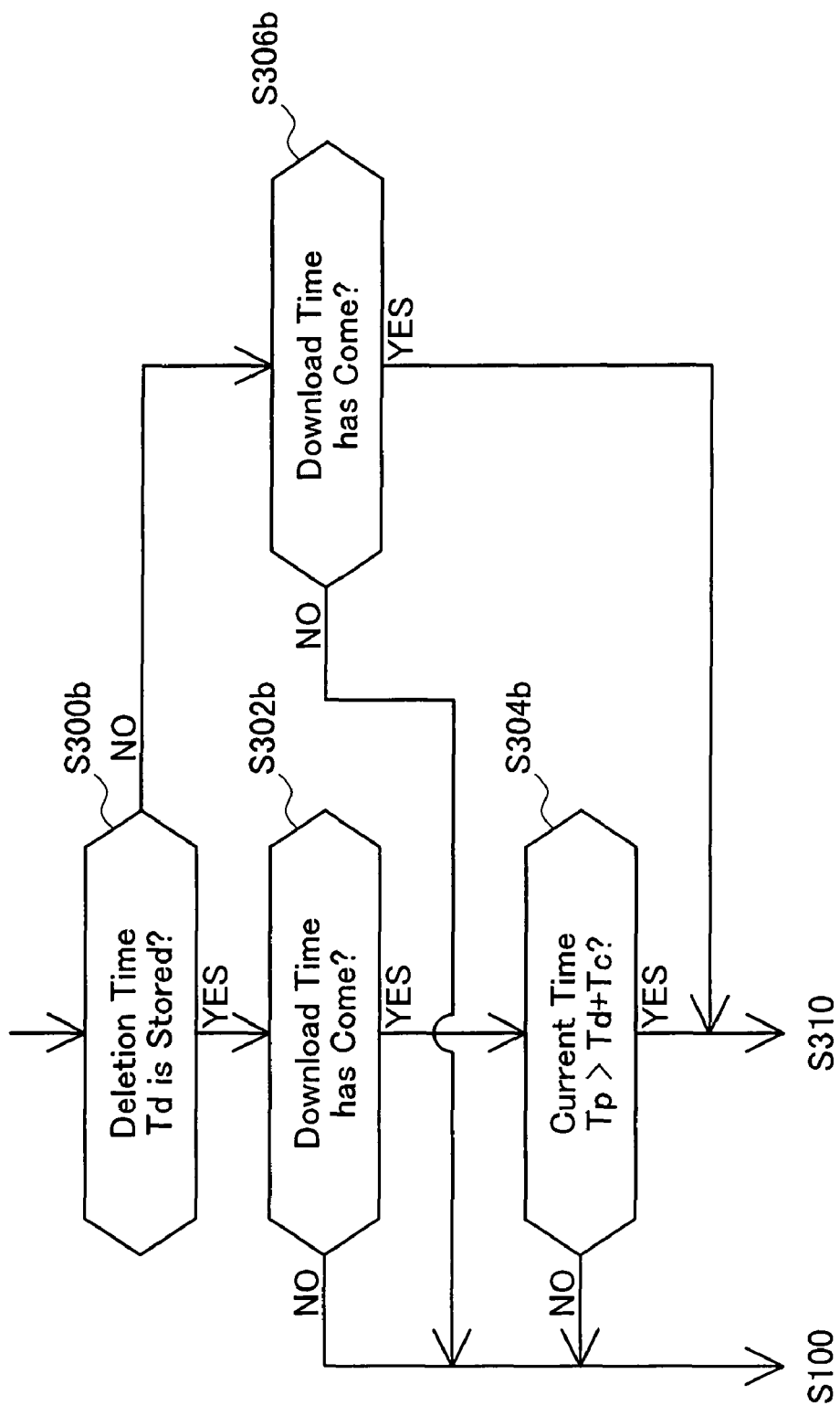
FIG. 11 is a flowchart showing a general operation flow of the printer PRT executed in a third embodiment.

FIG. 11 is a flowchart showing a general operation flow of the printer PRT executed in the third embodiment. The processing flow of FIG. 11 is executed instead of the processing of step S300 in the general operation flow of the first embodiment (see FIG. 5). In the third embodiment, each represented printer stores a deletion time Td into the memory 20 when the download request file is deleted in response to the received deletion request.

The CPU 10 identifies storage or non-storage of a deletion time Td in the memory 20 (step S300*b*). In the case of storage of the deletion time Td in the memory 20 (step S300*b*: yes), the CPU 10 refers to the timer 30 and determines whether the download time has come (step S302*b*). When the download time has not yet come (step S302*b*: no), the general operation flow returns to step S100 in the flowchart of FIG. 5. When the download time has come (step S302*b*: yes), on the other hand, the CPU 10 determines whether a current time Tp is after elapse of a preset time Tc from the deletion time Td (step S304*b*). The preset time Tc may be determined arbitrarily. When the current time Tp is not after elapse of the preset time Tc from the deletion time Td (step S304*b*: no), the general operation flow returns to step S100 in the flowchart of FIG. 5.

When the current time Tp is after elapse of the preset time Tc from the deletion time Td (step S304b: yes), on the other hand, the general operation flow goes to step S310 in the flowchart of FIG. 5.

In the case of non-storage of the deletion time Td in the memory 20 (step S300b: no), the CPU 10 refers to the timer 30 and determines whether the download time has come (step S306b). When the download time has not yet come (step S306b: no), the general operation flow returns to step S100 in the flowchart of FIG. 5. When the download time has come (step S306b: yes), the general operation flow goes to step S310 in the flowchart of FIG. 5.

In the information distributing system 1000 of the third embodiment described above, when the preset time Tc has not yet elapsed at the download time since previous transmission of a download request file and deletion of the sent download request file, even in the presence of any unsent download request file, which has not yet been sent to the management server SV, in the spool directory 22, the printer PRT determines that it is not the moment of collecting the download request files from the other printers PRT and sending the collected download request files with the unsent download request files to the management server SV. The printer PRT accordingly does not function as the representative printer but suspends the collection of the download request files from the other printers PRT and the download of the download data file from the management server SV until a next download time. This arrangement also further reduces the access frequency from the respective printers PRT to the management server SV, compared with the information distributing system 1000 of the first embodiment.

D. Fourth Embodiment

An information distributing system 1000 of a fourth embodiment has the same configuration as that of the information distributing system 1000 of the first embodiment. Each printer PRT in the fourth embodiment has the same structure as that of the printer PRT in the first embodiment. The processing executed by the CPU 10 of the custom network board CNB attached to the printer PRT of the fourth embodiment is partially different from the processing executed by the printer PRT of the first embodiment. The following describes the difference from the first embodiment.

Figure 12:
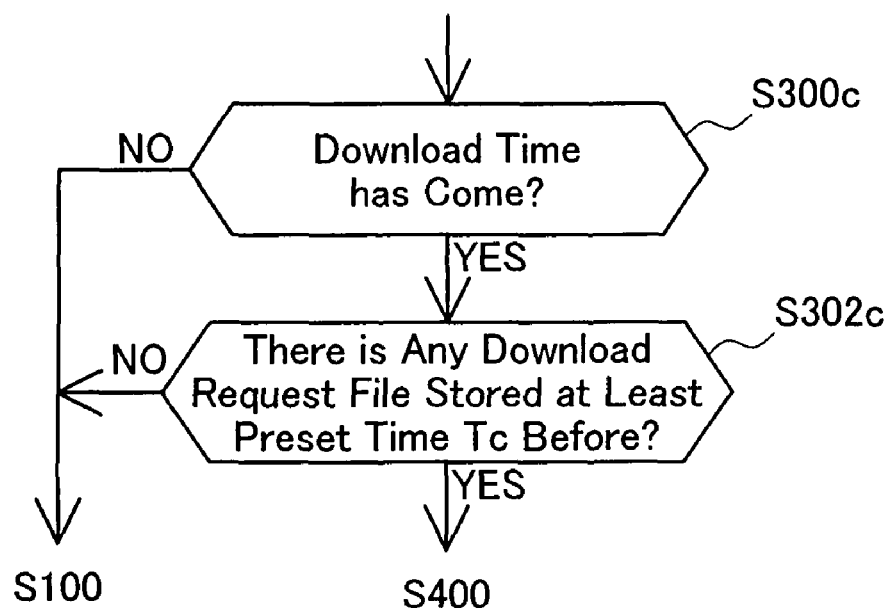
FIG. 12 is a flowchart showing a general operation flow of the printer PRT executed in a fourth embodiment.

FIG. 12 is a flowchart showing a general operation flow of the printer PRT executed in the fourth embodiment. The processing flow of FIG. 12 is executed instead of the processing of steps S310 and S320 in the general operation flow of the first embodiment (see FIG. 5). In the fourth embodiment, each printer PRT uses a storage time of each download request file stored in the spool directory 22.

The CPU 10 refers to the timer 30 and determines whether the download time has come (step S300c). When the download time has not yet come (step S300c: no), the general operation flow returns to step S100 in the flowchart of FIG. 5. When the download time has come (step S300c: yes), on the other hand, the CPU 10 determines whether there is any download request file that was stored at least a preset time Tc before in the spool directory 22 (step S302c). The preset time Tc may be determined arbitrarily. When the spool directory 22 has no download request file that was stored at least the preset time Tc before (step S302c: no), it is determined that there is no download request file to be sent to the management server SV immediately. The printer PRT is thus not specified as the representative printer and the general operation flow goes back to step S100 in the flowchart of FIG. 5. When the spool directory 22 has any download request file that was stored at least the preset time Tc before (step S302c: yes), on the other hand, it is determined that the stored download request file is to be sent to the management server SV immediately. The general operation flow thus goes to step S400 in the flowchart of FIG. 5 to specify the printer PRT as the representative printer and perform the download process.

In the information distributing system 1000 of the fourth embodiment described above, when the spool directory 22 at the download time has no unsent download request file that was stored at least the preset time Tc before, irrespective of the presence of any unsent download request file, the printer PRT determines that it is not the moment of collecting the download request files from the other printers PRT and sending the collected download request files with the unsent download request files to the management server SV. The printer PRT accordingly does not function as the representative printer but suspends the collection of the download request files from the other printers PRT and the download of the download data from the management server SV until a next download time. In the information distributing system 1000 of the fourth embodiment, during the preset time after execution of the download process by any printer PRT specified as the representative printer, no other printer PRT performs the download process. This arrangement also reduces the access frequency from the respective printers PRT to the management server SV.

E. Fifth Embodiment

An information distributing system 1000 of a fifth embodiment has the same configuration as that of the information distributing system 1000 of the first embodiment.

In the fifth embodiment, after download of download data from the management server SV, the representative printer notifies each represented printer of the self function as the representative printer in a current download process. This notification means that the representative printer in the current download process will be, in principle, the representative printer again in a next download process. Each of the represented printers receives this notification and successively sends each download request at its generation timing to the printer PRT that is the representative printer in the current download process and will be the representative printer again in a next download process. The representative printer PRT receives the download requests successively sent from the respective represented printers. At a next download time, the representative printer PRT does not send the transmission request for transmission of the download requests to the respective represented printers but sends the own download requests and the download requests received from the respective represented printers to the management server SV.

The representative printer is changed over, for example, in the event of failed transmission of download requests to the management server SV due to a power-off of the printer PRT expected to be the representative printer. Namely in the information distributing system 1000 of the fifth embodiment, the representative printer is not fixed for collection of download requests from the other printers PRT and transmission of the collected download requests to the management server SV. The representative printer is changed over according to the operating statuses of the respective printers PRT. The change-over of the representative printer will be described later in detail.

E1. Structure of Printer

Each printer PRT in the fifth embodiment has the same structure as that of the printer PRT in the first embodiment.

The processing executed by the CPU 10 of the custom network board CNB attached to the printer PRT of the fifth embodiment is partially different from the processing executed by the printer PRT of the first embodiment. The following describes the difference from the first embodiment.

The memory control module 12 controls operations of writing, reading, and deleting various data into and from the memory 20. The data stored in the memory 20 include download request files recording own download requests to the management server SV, download request files collected from the other printers PRT, a collective download request file to be sent to the management server SV, a download data file downloaded from the management server SV, and an identification information file recording identification information of the specified representative printer. The download request file may be generated after elapse of a preset time since a previous download time or may be generated by analyzing the contents of download data. The memory 20 and the memory control module 12 are equivalent to the download request storage module and the download request deletion module of the invention.

The decision module 14 makes decisions with regard to a printer general operation flow, a file collection process, and a download process described later.

E2. Printer General Operation Flow

Figure 13:
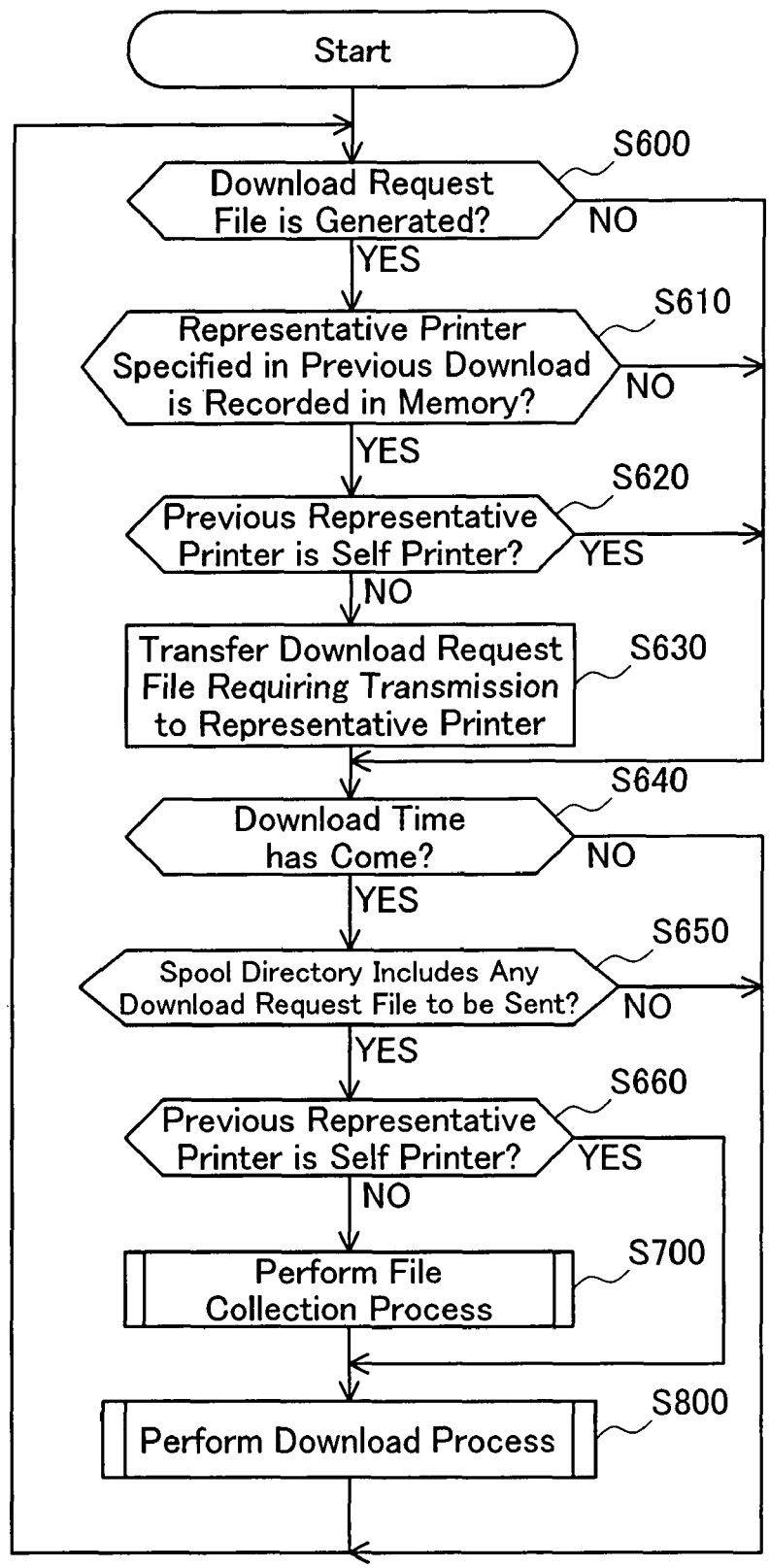
FIG. 13 is a flowchart showing a general operation flow of the printer PRT.

FIG. 13 is a flowchart showing a general operation flow of the printer PRT. The general operation flow starts in response to a power-on operation and is continually performed until a power-off operation by the CPU 10 of the custom network board CNB in each printer PRT.

The CPU 10 first detects generation of a download request file (step S600). Upon generation of a download request file (step S600: yes), the CPU 10 stores the generated download request file into the spool directory 22 and determines whether a file representing the identification information of the representative printer specified in a previous download process is recorded in the memory 20 (step S610). This file is not recorded in the initial stage at the power-on of the printer PRT. When the file representing the identification information of the representative printer specified in the previous download process is recorded in the memory 20 (step S610: yes), the CPU 10 identifies whether the representative printer specified in the previous download process is the self printer PRT (step S620). When the representative printer specified in the previous download process is not the self printer PRT (step S620: no), the CPU 10 expects that the printer PRT recorded as the representative printer in the previous download process will function again as the representative printer in a next download process. Any download request file to be sent to the management server SV is then transferred to the printer PRT recorded as the representative printer in the previous download process (step S630).

The CPU 10 subsequently refers to the timer 30 and determines whether the download time has come (step S640). The determination of step S640 is also executed when no download request file is generated (step S600: no), when no file representing the identification information of the representative printer specified in the previous download process is recorded in the memory 20 (step S610: no), or when the representative printer specified in the previous download process is the self printer PRT (step S620: yes).

When the download time has not yet come (step S640: no), the general operation flow returns to step S600. When the download time has come (step S640: yes), on the other hand, the CPU 10 determines whether the spool directory 22 stores any download request file to be sent to the management server SV (step S650).

When the spool directory 22 does not include any download request file to be sent to the management server SV (step S650: no), the general operation flow returns to step S600. When the spool directory 22 includes any download request file to be sent to the management server SV (step S650: yes), on the other hand, the CPU 10 identifies whether the representative printer specified in the previous download process is the self printer PRT (step S660).

When the representative printer specified in the previous download process is the self printer PRT (step S660: yes), the CPU 10 makes the self printer PRT function as the representative printer and performs a download process (step S800). When the representative printer specified in the previous download process is not the self printer PRT (step S660: no), on the other hand, the CPU 10 changes over the function of the self printer PRT from the represented printer to the representative printer and successively performs a file collection process (step S700) and the download process (step S800). The details of the file collection process and the download process will be described later.

On completion of the download process, the general operation flow returns to step S600 and repeats the above series of processing.

E3. File Collection Process

Figure 14:
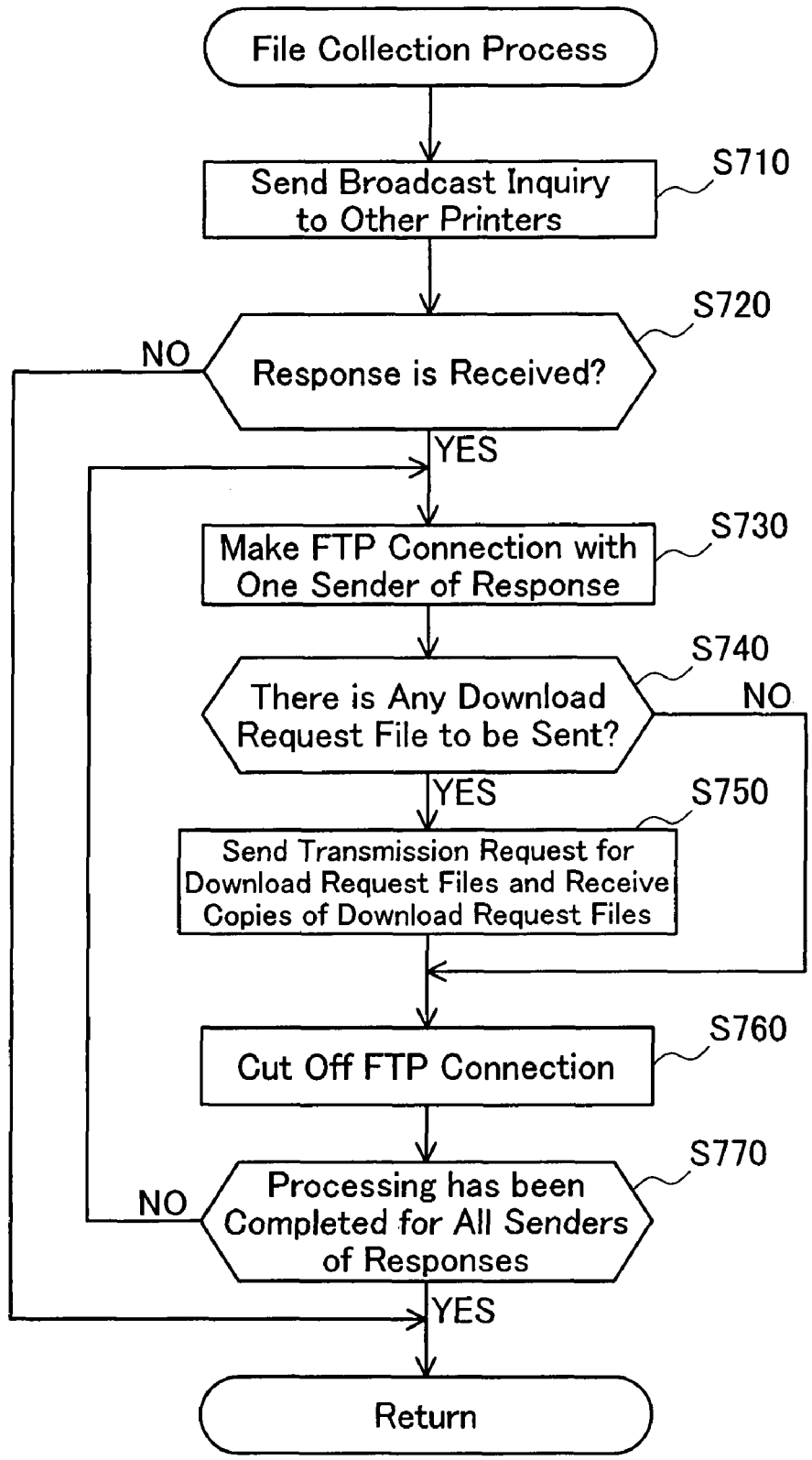
FIG. 14 is a flowchart showing the details of a file collection process.

FIG. 14 is a flowchart showing the details of the file collection process executed at step S700 in the general operation flow of FIG. 13. When the representative printer specified in the previous download process is powered off or otherwise falls into the state of failed download and another printer PRT is specified as the new representative printer, the CPU 10 of the representative printer performs this file collection process.

The CPU 10 of the representative printer sends a broadcast inquiry for confirmation of the presence to all the other printers PRT connected to the local area network LAN (step S710). The CPU 10 then determines whether a response to the broadcast inquiry is received from any of the other printers PRT (step S720). In the case of no reception of any response to the broadcast inquiry from any of the other printers PRT (step S720: no), the CPU 10 identifies the absence of any represented printer as an object of collection of download request files and immediately terminates the file collection process.

In the event of reception of any response to the broadcast inquiry from any of the other printers PRT (step S720: yes), on the other hand, the CPU 10 makes an FTP connection with one of the other printers PRT as senders of the responses to the broadcast inquiry (step S730) and sends an inquiry to the FTP-connected printer PRT about the presence of any download request file as the object to be sent to the management server SV (step S740). When the FTP-connected printer PRT has any download request file as the object to be sent to the management server SV (step S740: yes), the CPU 10 sends a transmission request for all the object download request files and receives copies of all the object download request files (step S750). The received copies of the object download request files are stored in the 'other' directory 24. The CPU 10 subsequently cuts off the FTP connection (step S760). When the FTP-connected printer PRT has no download request file as the object to be sent to the management server SV (step S740: no), on the other hand, the CPU 10 immediately cuts off the FTP connection without any further processing (step S760).

The CPU 10 determines whether the processing of steps S730 to S760 has been completed for all the other printers PRT as the senders of the responses to the broadcast inquiry (step S770). When there is any printer PRT that has not yet been the target of the processing of steps S730 to S760 (step S770: no), the file collection process goes back to step S730. When the processing of steps S730 to S760 has been completed for all the other printers PRT as the senders of the responses to the broadcast inquiry (step S770: yes), on the other hand, the CPU 10 terminates the file collection process.

E4. Download Process

Figure 15:
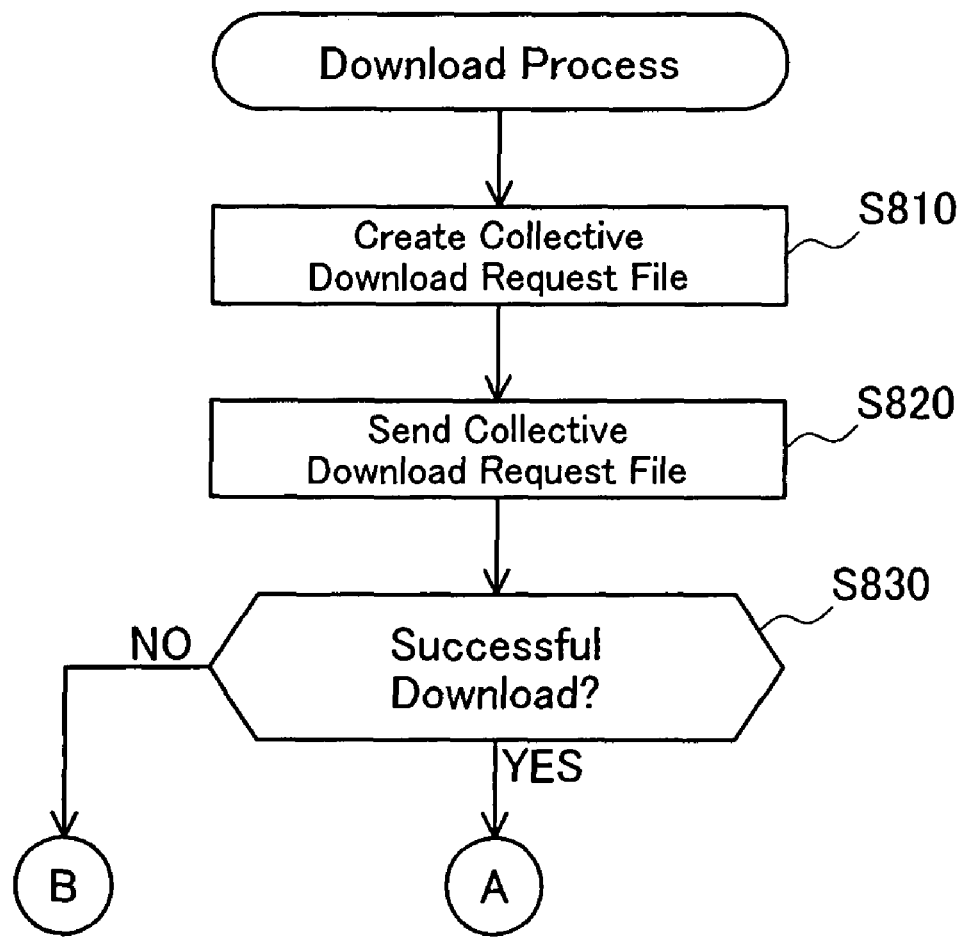
FIG. 15 is a flowchart showing the details of a download process.
Figure 16:
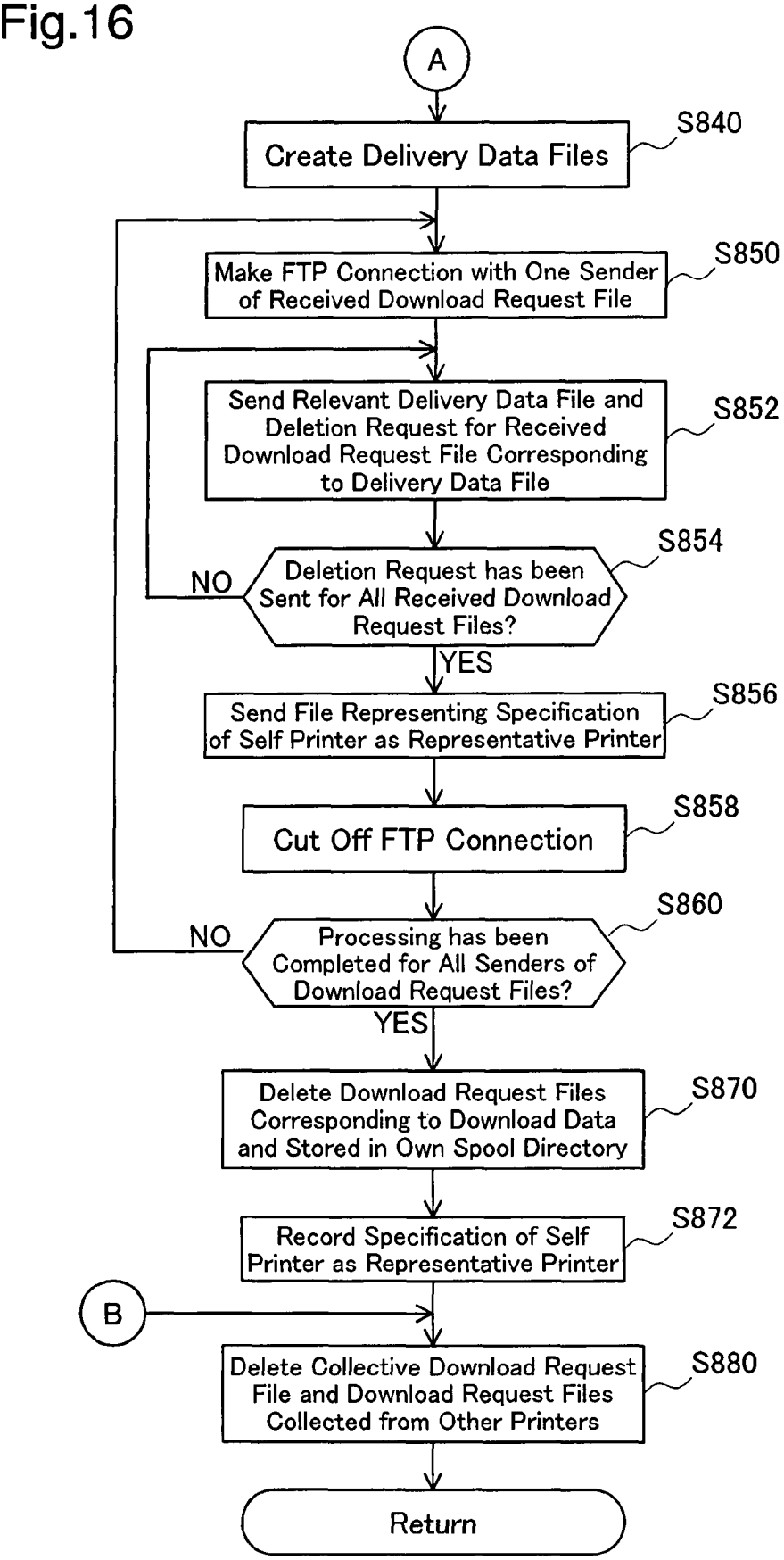
FIG. 16 is a flowchart showing the details of the download process.

FIGS. 15 and 16 are flowcharts showing the details of the download process executed at step S800 in the general operation flow of FIG. 13. The download process is performed by the CPU 10 of the representative printer.

The CPU 10 combines the download request files stored in the spool directory 22 with the download request files stored in the 'other' directory 24 to create a collective download request file Fr (step S810). The created collective download request file Fr is stored into the collective download request file directory 26, is compressed, and is sent to the management server SV (step S820). The transmission of the collective download request file Fr to the management server SV adopts the SSL (Secure Socket Layer) standard for the enhanced security.

The CPU 10 then identifies successful download or failed download (step S830). This identification is based on reception of a download data file from the management server SV. In the event of reception of the download data file from the management server SV, the CPU 10 identifies successful download. In the event of no reception of the download data file from the management server SV, on the contrary, the CPU 10 identifies failed download.

In the case of successful download (step S830: yes), the CPU 10 analyzes the download data and creates delivery data files (step S840).

The CPU 10 then makes an FTP connection with one of the represented printers as the senders of the received download request files (step S850) and sends a relevant one of the created delivery data files and a deletion request for deletion of the received download request file corresponding to the relevant delivery data file to the FTP-connected represented printer (step S852). One deletion request is sent for each received download request file. When the FTP-connected printer PRT is newly powered on or otherwise to have no storage of any sent download request file, the deletion request is not sent to the FTP-connected printer PRT. The FTP-connected printer PRT receives the deletion request from the representative printer and deletes the sent download request file stored therein. This leaves only unsent download request files, which have not yet been sent to the management server SV, in the spool directory 22 of the FTP-connected printer PRT receiving the deletion request. This arrangement enables the CPU 10 to readily identify the presence of any unsent download request file in the spool directory 22.

The CPU 10 determines whether the deletion request has been sent for all the received download request files to the FTP-connected printer PRT (step S854). When there is any download request file that has been sent from the FTP-connected printer PRT but has not yet received the deletion request (step S854: no), the download process goes back to step S852. When the deletion request has been sent for all the received download request files (step S854: yes), on the other hand, the CPU 10 sends a file representing identification information of the self printer specified as the representative printer in the current download process to the FTP-connected printer PRT (step S856). The file is stored into the memory 20 of the FTP-connected printer PRT. The CPU 10 subsequently cuts off the FTP connection with the printer PRT (step S858).

The CPU 10 determines whether the processing of steps S850 to S858 has been completed for all the represented printers as the senders of the received download request files (step S860). When there is any represented printer that has not yet been the target of the processing of steps S850 to S858 (step S860: no), the download process goes back to step S850. When the processing of steps SS850 to S858 has been completed for all the represented printers as the senders of the received download request files (step S860: yes), on the other hand, the CPU 10 deletes the download request files, which correspond to the download data and are stored in the own spool directory 22 (step S870). The CPU 10 then creates a file representing specification of the self printer as the representative printer in the current download process and records the created file into the memory 20 (step S872). The CPU 10 successively deletes the collective download request file Fr stored in the collective download request file directory 26 and the download request files received from the represented printers and stored in the 'other' directory 24 (step S880). The CPU 10 then terminates the download process.

In the event of failed download (step S830: no), on the other hand, the CPU 10 deletes the collective download request file Fr stored in the collective download request file directory 26 and the download request files received from the represented printers and stored in the 'other' directory 24 (step S880), while keeping the download request files stored in the spool directory 22 until execution of the file collection process and the subsequent download process by any printer PRT. The CPU 10 then terminates the download process.

In the information distributing system 1000 of the fifth embodiment described above, the representative printer collectively sends the own download requests and the download requests received from the represented printers to the management server SV. This arrangement desirably reduces the access frequency from the respective printers PRT to the management server SV. Whenever a download request file is generated in a represented printer, the represented printer successively sends the generated download request file to the representative printer. Even when a large number of printers PRT are connected to the information distributing system 1000, this arrangement prevents simultaneous transmission of download request files from a large number of represented printers to the representative printer. This arrangement effectively restrains an abrupt increase in network traffic by simultaneous transmission of the download request files from the respective represented printers to the representative printer. The information distributing system 1000 of the fifth embodiment desirably reduces the access frequency from the respective printers PRT to the management server SV and restrains an abrupt increase in network traffic by the simultaneous transmission of the download request files.

F. Sixth Embodiment

An information distributing system 1000 of a sixth embodiment has the same configuration as that of the information distributing system 1000 of the fifth embodiment. Each printer PRT in the sixth embodiment has the same structure as that of the printer PRT in the fifth embodiment. The processing executed by the CPU 10 of the custom network board CNB attached to the printer PRT of the sixth embodiment is partially different from the processing executed by the printer PRT of the fifth embodiment. The following describes the difference from the fifth embodiment.

Figure 17:
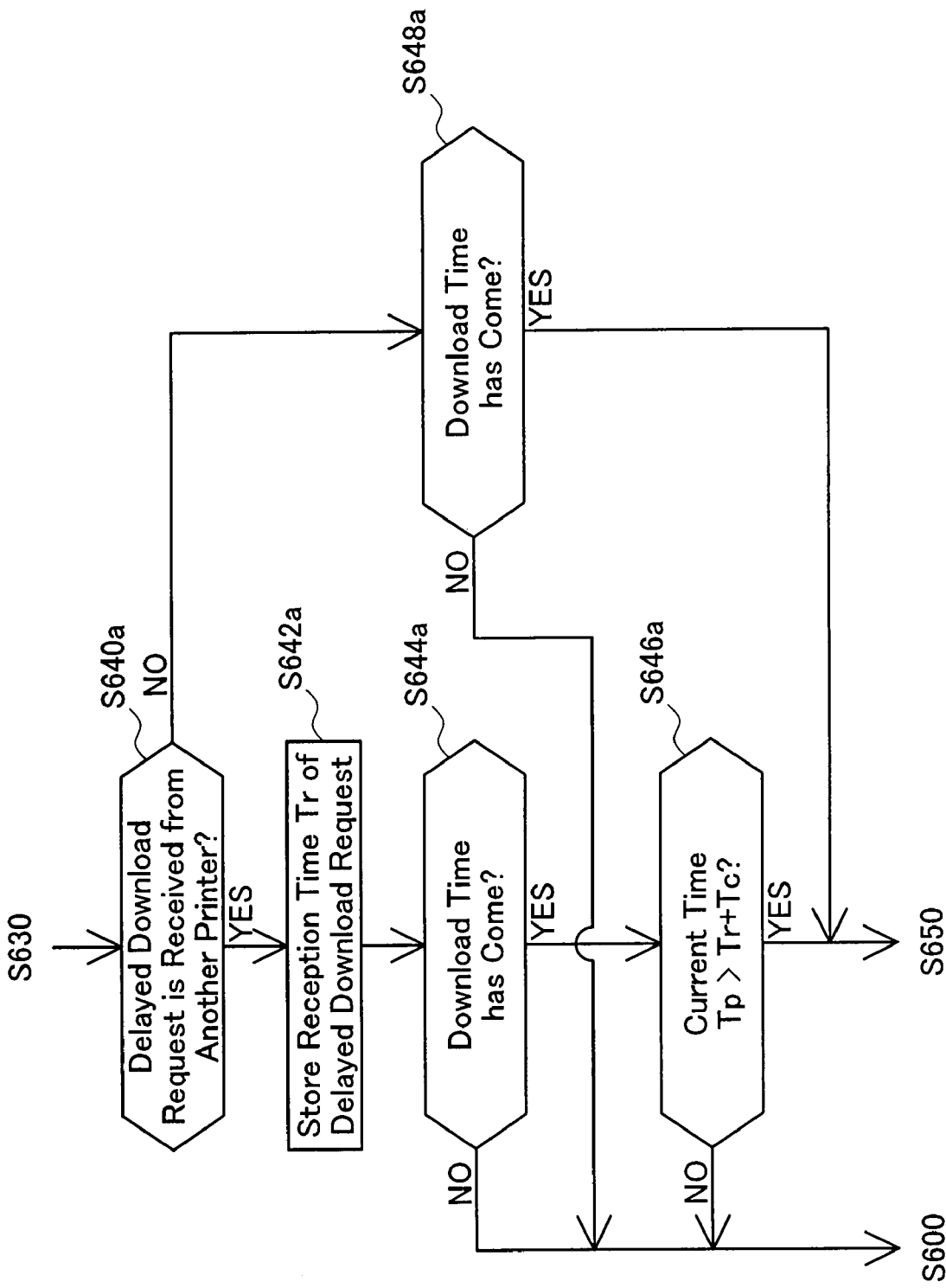
FIG. 17 is a flowchart showing a general operation flow of the printer PRT executed in a sixth embodiment.

FIG. 17 is a flowchart showing a general operation flow of the printer PRT executed in the sixth embodiment. The processing flow of FIG. 17 is executed instead of the processing of step S640 in the general operation flow of the fifth embodiment (see FIG. 13). In the sixth embodiment, the representative printer sends a delayed download request to the represented printers in the case of successful download of the download data file Fd from the management server SV as described below.

The CPU 10 identifies reception or no reception of a delayed download request from another printer or the representative printer (step S640a). In the case of reception of the delayed download request (step S640a: yes), the CPU 10 refers to the timer 30 and stores a reception time Tr of the delayed download request into the memory 20 (step S642a).

The CPU 10 then refers to the timer 30 and determines whether the download time has come (step S644a). When the download time has not yet come (step S644a: no), the general operation flow returns to step S600 in the flowchart of FIG. 13. When the download time has come (step S644a: yes), on the other hand, the CPU 10 determines whether a current time Tp is after elapse of a preset time Tc from the reception time Tr of the delayed download request (step S646a). The preset time Tc may be determined arbitrarily. When the current time Tp is not after elapse of the preset time Tc from the reception time Tr of the delayed download request (step S646a: no), the general operation flow returns to step S600 in the flowchart of FIG. 13. When the current time Tp is after elapse of the preset time Tc from the reception time Tr of the delayed download request (step S646a: yes), on the other hand, the general operation flow goes to step S650 in the flowchart of FIG. 13.

In the case of no reception of the delayed download request from the representative printer (step S640a: no), the CPU 10 refers to the timer 30 and determines whether the download time has come (step S648a). When the download time has not yet come (step S648a: no), the general operation flow returns to step S600 in the flowchart of FIG. 13. When the download time has come (step S648a: yes), the general operation flow goes to step S650 in the flowchart of FIG. 13.

Figure 18:
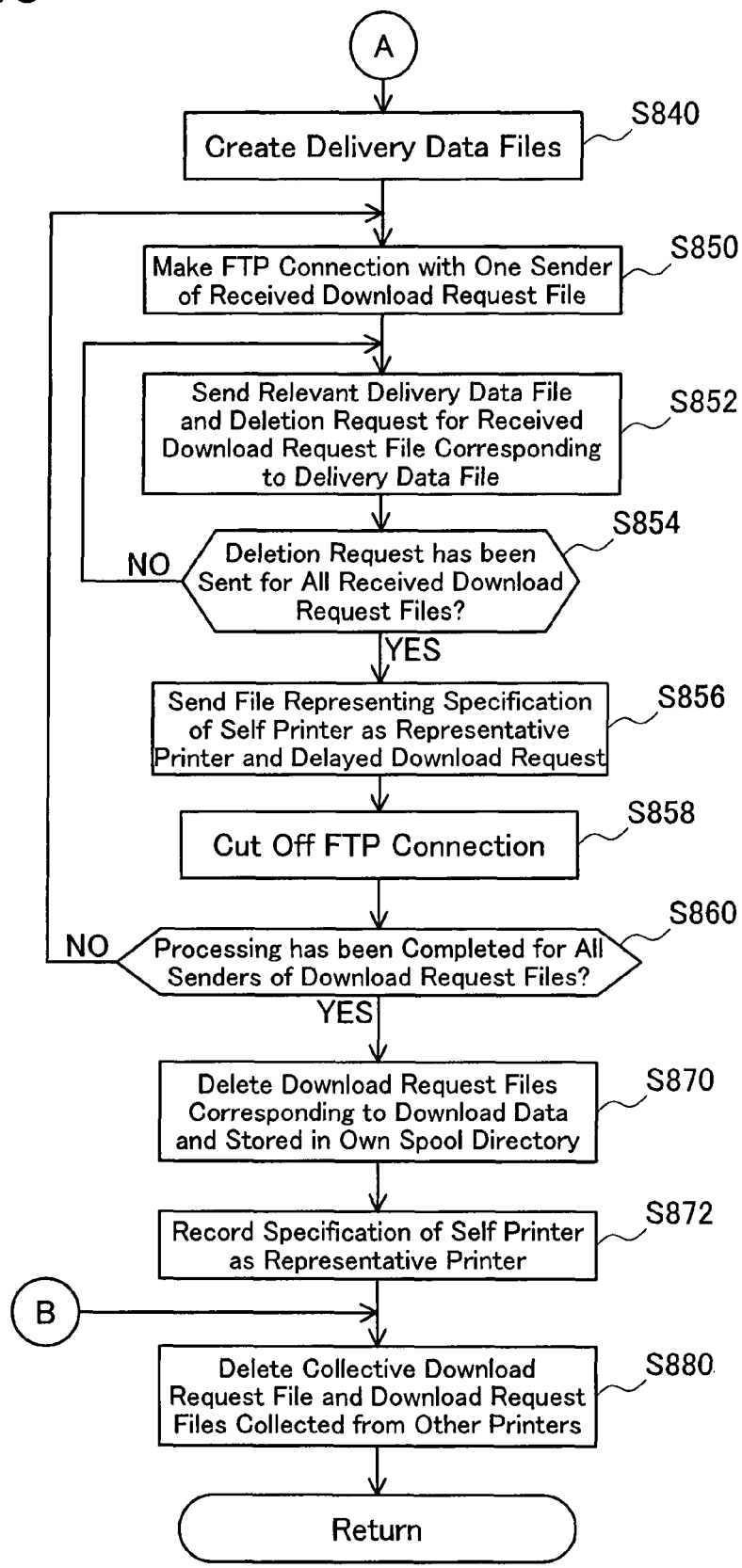
FIG. 18 is a flowchart showing the details of a download process executed in the general operation flow of the sixth embodiment.

FIG. 18 is a flowchart showing a download process executed in the sixth embodiment. The download process of the sixth embodiment includes a partly different processing flow after step S830 from the download process of the fifth embodiment (see FIGS. 15 and 16). Specifically the download process of the sixth embodiment executes step S856a, instead of step S856 in the flowchart of FIG. 16. Otherwise the download process of the sixth embodiment is identical with the download process of the fifth embodiment.

When the deletion request has been sent for all the received download request files (step S854: yes), on the other hand, the CPU 10 sends a file representing identification information of the self printer specified as the representative printer in the current download process and a delayed download request to the FTP-connected printer PRT (step S856a). The file and the reception time Tr of the delayed download request are stored into the memory 20 of the FTP-connected printer PRT. The CPU 10 then cuts off the FTP connection with the printer PRT (step S858).

In the information distributing system 1000 of the sixth embodiment described above, when the preset time Tc has not yet elapsed at the download time since reception of the delayed download request from the representative printer, even in the presence of any unsent download request file, which has not yet been sent to the management server SV, in the spool directory 22, the printer PRT determines that it is not the moment of collecting the download request files from the other printers PRT and sending the collected download request files with the unsent download request files to the management server SV. The printer PRT accordingly does not function as the representative printer but suspends the collection of the download request files from the other printers PRT and the download of download data from the management server SV until a next download time. The information distributing system 1000 of the sixth embodiment preferably uses only one printer PRT as the representative printer to the maximum possible extent and prevents the multiple printers PRT from individually performing the download process. This arrangement further reduces the access frequency from the respective printers PRT to the management server SV, compared with the information distributing system 1000 of the fifth embodiment.

G. Seventh Embodiment

An information distributing system 1000 of a seventh embodiment has the same configuration as that of the information distributing system 1000 of the fifth embodiment. Each printer PRT in the seventh embodiment has the same structure as that of the printer PRT in the fifth embodiment. The processing executed by the CPU 10 of the custom network board CNB attached to the printer PRT of the seventh embodiment is partially different from the processing executed by the printer PRT of the fifth embodiment. The following describes the difference from the fifth embodiment.

Figure 19:
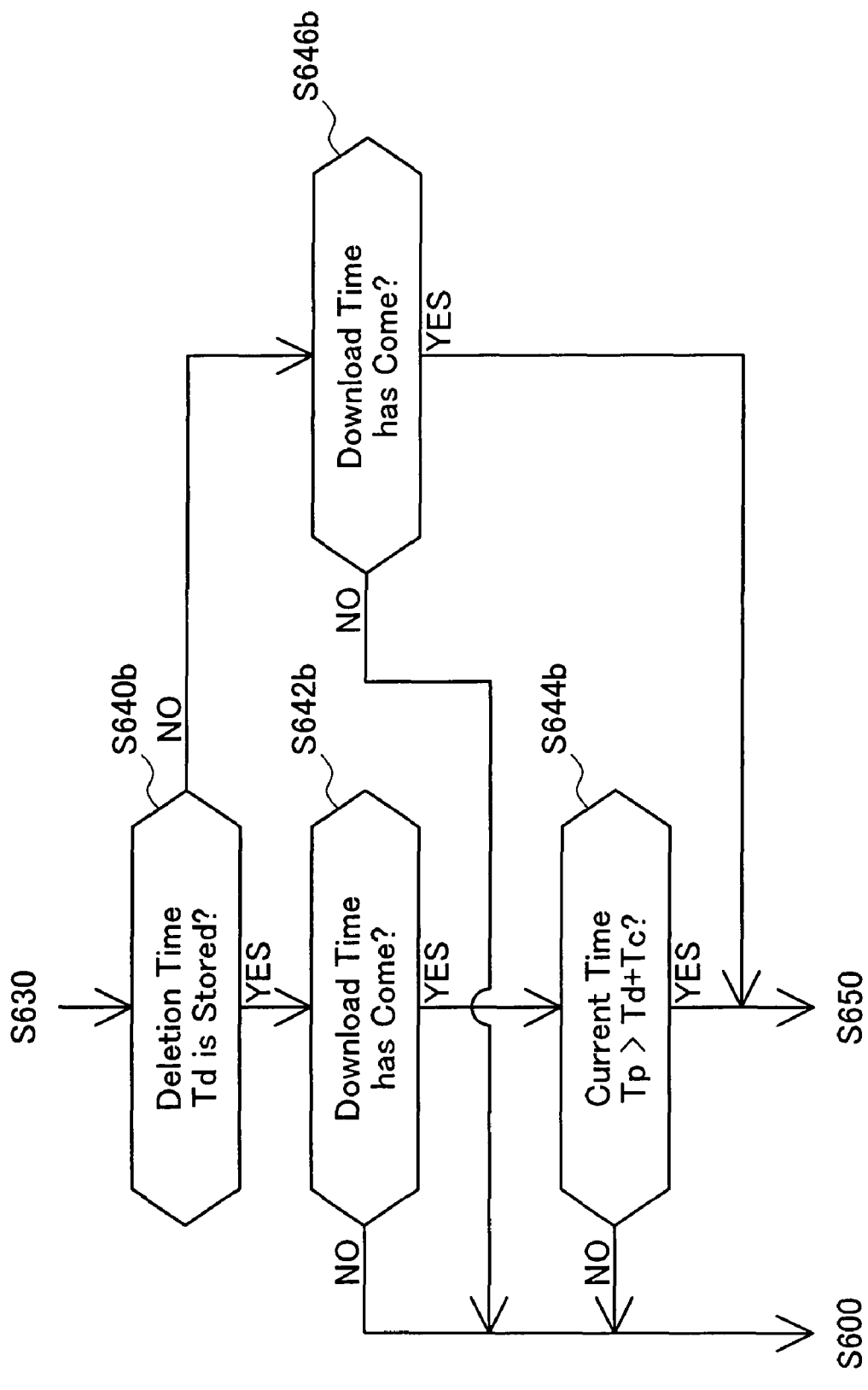
FIG. 19 is a flowchart showing a general operation flow of the printer PRT executed in a seventh embodiment.

FIG. 19 is a flowchart showing a general operation flow of the printer PRT executed in the seventh embodiment. The processing flow of FIG. 19 is executed instead of the processing of step S640 in the general operation flow of the fifth embodiment (see FIG. 13). In the seventh embodiment, each represented printer stores a deletion time Td into the memory 20 when the download request file is deleted in response to the received deletion request.

The CPU 10 identifies storage or non-storage of a deletion time Td in the memory 20 (step S640b). In the case of storage of the deletion time Td in the memory 20 (step S640b: yes), the CPU 10 refers to the timer 30 and determines whether the download time has come (step S642b). When the download time has not yet come (step S642b: no), the general operation flow returns to step S600 in the flowchart of FIG. 13. When the download time has come (step S642b: yes), on the other hand, the CPU 10 determines whether a current time Tp is after elapse of a preset time Tc from the deletion time Td (step S644b). The preset time Tc may be determined arbitrarily. When the current time Tp is not after elapse of the preset time Tc from the deletion time Td (step S644b: no), the general operation flow returns to step S600 in the flowchart of FIG. 13. When the current time Tp is after elapse of the preset time Tc from the deletion time Td (step S644b: yes), on the other hand, the general operation flow goes to step S660 in the flowchart of FIG. 13.

In the case of non-storage of the deletion time Td in the memory 20 (step S640b: no), the CPU 10 refers to the timer 30 and determines whether the download time has come (step S646b). When the download time has not yet come (step S646b: no), the general operation flow returns to step S600 in the flowchart of FIG. 13. When the download time has come (step S646b: yes), the general operation flow goes to step S650 in the flowchart of FIG. 13.

In the information distributing system 1000 of the seventh embodiment described above, when the preset time Tc has not yet elapsed at the download time since previous transmission of a download request file and deletion of the sent download request file, even in the presence of any unsent download request file, which has not yet been sent to the management server SV, in the spool directory 22, the printer PRT determines that it is not the moment of collecting the download request files from the other printers PRT and sending the collected download request files with the unsent download request files to the management server SV. The printer PRT accordingly does not function as the representative printer but suspends the collection of the download request files from the other printers PRT and the download of download data from the management server SV until a next download time. This arrangement also further reduces the access frequency from the respective printers PRT to the management server SV, compared with the information distributing system 1000 of the fifth embodiment.

H. Eighth Embodiment

An information distributing system 1000 of an eighth embodiment has the same configuration as that of the information distributing system 1000 of the fifth embodiment. Each printer PRT in the eighth embodiment has the same structure as that of the printer PRT in the fifth embodiment. The processing executed by the CPU 10 of the custom network board CNB attached to the printer PRT of the eighth embodiment is partially different from the processing executed by the printer PRT of the fifth embodiment. The following describes the difference from the fifth embodiment.

Figure 20:
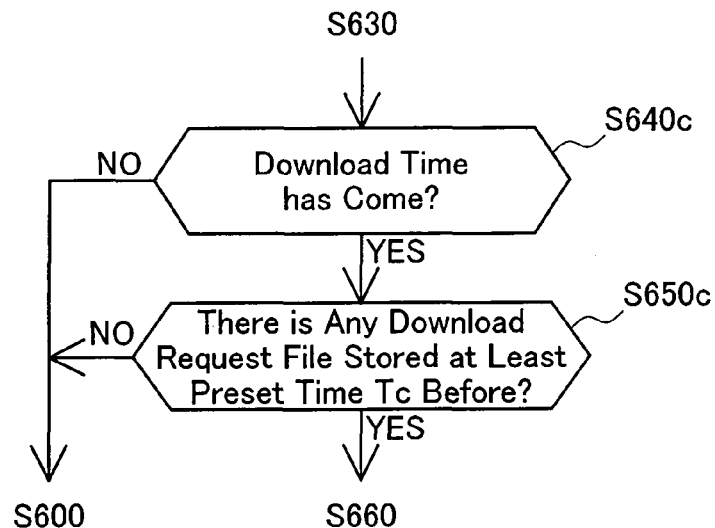
FIG. 20 is a flowchart showing a general operation flow of the printer PRT executed in an eighth embodiment.

FIG. 20 is a flowchart showing a general operation flow of the printer PRT executed in the eighth embodiment. The processing flow of FIG. 20 is executed instead of the processing of steps S640 and S650 in the general operation flow of the fifth embodiment (see FIG. 13). In the eighth embodiment, each printer PRT uses a storage time of each download request file stored in the spool directory 22.

The CPU 10 refers to the timer 30 and determines whether the download time has come (step S640*c*). When the download time has not yet come (step S640*c*: no), the general operation flow returns to step S600 in the flowchart of FIG. 13. When the download time has come (step S640*c*: yes), on the other hand, the CPU 10 determines whether there is any download request file that was stored at least a preset time Tc before in the spool directory 22 (step S650*c*). The preset time Tc may be determined arbitrarily. When the spool directory 22 has no download request file that was stored at least the preset time Tc before (step S650*c*: no), it is determined that there is no download request file to be sent to the management server SV immediately. The printer PRT is thus not specified as the representative printer and the general operation flow goes back to step S600 in the flowchart of FIG. 13. When the spool directory 22 has any download request file that was stored at least the preset time Tc before (step S650*c*: yes), on the other hand, it is determined that the stored download request file is to be sent to the management server SV immediately. The general operation flow thus goes to step S660 in the flowchart of FIG. 13 to specify the printer PRT as the representative printer and perform the download process.

In the information distributing system 1000 of the eighth embodiment described above, when the spool directory 22 at the download time has no unsent download request file that was stored at least the preset time Tc before, irrespective of the presence of any unsent download request file, the printer PRT determines that it is not the moment of collecting the download request files from the other printers PRT and sending the collected download request files with the unsent download request files to the management server SV. The printer PRT accordingly does not function as the representative printer but suspends the collection of the download request files from the other printers PRT and the download of download data from the management server SV until a next download time. In the information distributing system 1000 of the eighth embodiment, during the preset time after execution of the download process by any printer PRT specified as the representative printer, no other printer PRT performs the download process. This arrangement also reduces the access frequency from the respective printers PRT to the management server SV.

I. Modifications

The embodiments and the examples discussed above are to be considered in all aspects as illustrative and not restrictive. There may be many modifications, changes, and alterations without departing from the scope or spirit of the main characteristics of the present invention. Some examples of possible modification are given below.

I1. Modified Example 1

In the information distributing systems of the respective embodiments described above, each printer PRT has the timer 30. The printer PRT may alternatively have a clock or may otherwise obtain the time from an NTP server located on the Internet INT according to the requirements.

I2. Modified Example 2

In the information distributing systems of the respective embodiments described above, each of the multiple printers PRT has the custom network board CNB and is capable of functioning as the representative printer. It is, however, not necessary that all the printers PRT have the custom network board CNB. The requirement is that at least two printers PRT have the custom network board CNB to be capable of functioning as the representative printer. In this modified arrangement, any other printer without the custom network board CNB is not capable of functioning as the representative printer but has the functions of transferring and deleting download request files in response to requests from the representative printer.

I3. Modified Example 3

In the information distributing systems of the respective embodiments described above, each represented printer deletes the sent download request files in response to the deletion request from the representative printer. In one possible modification, the sent download request files may be deleted in response to reception of delivery data.

I4. Modified Example 4

In the information distributing systems of the respective embodiments described above, in the case of successful download of a download data file from the management server SV, the download process creates delivery data and sends relevant ones of the created delivery data to the respective printers PRT. This processing is, however, not restrictive. In one possible modification, until reception of a delivery request from another printer PRT, the download data file may be stored in the download directory 28. The representative printer may send delivery data in response to a delivery request from another printer PRT. The delivery data may be created before or after reception of the delivery request from another printer PRT.

I5. Modified Example 5

In the information distributing systems of the third and the seventh embodiments described above, each printer PRT stores the deletion time Td of the download request file into the memory 20 and identifies the requirement or non-requirement for the download process, based on the deletion time Td. The deletion time Td is, however, not essential for identification of the requirement for the download process. The identification of the requirement or non-requirement for the download process may be based on, for example, a transmission time of each download request file to the representative printer, a reception time of a reception complete response of each download request file from the representative printer, or a reception time of the deletion request from the representative printer, in place of the deletion time Td.

I6. Modified Example 6

In the information distributing systems of the second to the fourth embodiments and of the sixth to the eighth embodiments described above, the general operation flow of the printer PRT determines whether the spool directory 22 stores any unsent download request file to be sent to the management server SV. This decision may be omitted.

I7. Modified Example 7

In the information distributing systems of the first to the fourth embodiments described above, the information distribution control apparatus of the invention is applied to the printers PRT connecting with the network. This example is, however, not restrictive in any sense. The information distribution control apparatus of the invention is applicable to any of other diverse devices connecting with the network, for example, scanners, projectors, audio devices, electrical appliances, client computers, and PDAs (personal digital assistants).

I8. Modified Example 8

In the information distributing systems of the fifth to the eighth embodiments described above, in the general operation flow of the printer PRT shown in the flowchart of FIG. 13, no file representing the identification information of the representative printer specified in the previous download process is recorded in the initial stage at the power-on time. In one possible modification, an activation setting process may be executed at a power-on time of the newly powered-on printer PRT.

Figure 21:
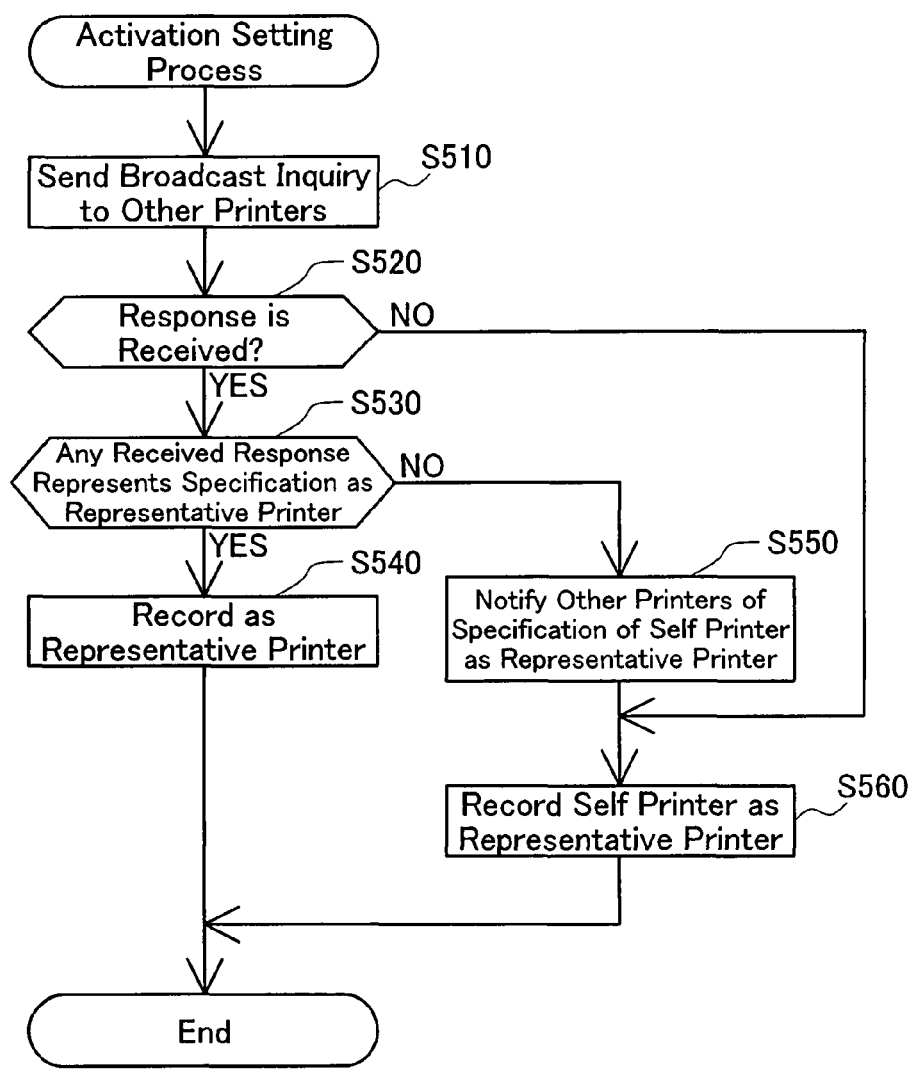
FIG. 21 is a flowchart showing an activation setting process.

FIG. 21 is a flowchart showing the activation setting process. The activation setting process is executed prior to step S600 by the CPU 10 of the custom network board CNB.

The CPU 10 first sends a broadcast inquiry about the current status as the representative printer or the represented printer to all the other printers PRT connecting with the local area network LAN (step S510). The CPU 10 then determines whether a response to the broadcast inquiry is received from any of the other printers PRT (step S520).

In the event of reception of any response to the broadcast inquiry from any of the other printers PRT (step S520: yes), the CPU 10 determines whether any of the received responses represents specification as the representative printer (step S530). When the response representing specification as the representative printer is received from any of the other printers PRT (step S530: yes), the printer PRT that has sent the response representing specification as the representative printer is recorded as the representative printer (step S540). The CPU 10 then terminates the activation setting process.

When no response representing specification as the representative printer is received from any of the other printers PRT (step S530: no), on the other hand, the CPU 10 sends a file representing the self identification information to the other printers PRT as the senders of the responses to the broadcast inquiry and accordingly notifies the other printers PRT of specification of the self printer as the representative printer (step S550). The CPU 10 records the self printer as the representative printer (step S560) and terminates the activation setting process. In the case of no reception of any response to the broadcast inquiry from any of the other printers (step S520: no), the CPU 10 records the self printer as the representative printer (step S560) and terminates the activation setting process.

At the power-on time of the newly powered-on printer PRT, the CPU 10 identifies the current representative printer PRT in this activation setting process and then executes the general operation flow shown in the flowchart of FIG. 13.

I9. Modified Example 9

In the information distributing systems of the fifth to the eighth embodiments described above, each represented printer sends a download request file to the representative printer whenever the download request file is generated. The transmission of download request files is not restricted to this timing. Each represented printer may send a download request file at any timing irrelevant to the representative printer. For example, whenever a predetermined number of unsent download request files are accumulated in each represented printer, the represented printer may collectively send the predetermined number of unsent download request files to the representative printer.

F9. Modified Example 9

In the information distributing systems of the fifth to the eighth embodiments described above, the device of the invention is applied to the printers PRT connecting with the network. This example is, however, not restrictive in any sense. The device of the invention is applicable to any of other diverse devices connecting with the network, for example, scanners, projectors, audio devices, electrical appliances, client computers, and PDAs (personal digital assistants).

The invention claimed is:

1. An information distribution control apparatus for being built in a device connecting with a network, comprising:
   a download request storage circuit for storing a download request for downloading information from a server connecting with the network, wherein the information is different from a print job;
   a decision circuit for determining at a preset timing whether any download request which is to be sent to the server is stored in the download request storage circuit;
   a transmission request sending circuit for sending a transmission request to another device connecting with the network when the decision circuit determines that the download request is stored in the download request storage circuit, wherein the another device sends a download request which is to be sent to the server and is stored in the another device, to the device in response to the transmission request;

a collection circuit for collecting the download request sent from the another device;

a transmission circuit for sending, to the server, the download request stored in the download request storage circuit and the download request collected from the another device, wherein the server sends information to the device in response to the download request sent from the device and the information sent from the server is different from a print job;

a receiving circuit for receiving the information sent from the server; and a delivery circuit for distributing, to the another device, a portion of the information received from the server, the portion being information based on the download request collected from the another device.

2. The information distribution control apparatus in accordance with claim 1, further comprising: a transmission request receiving circuit for receiving from another device a transmission request for sending the downloading request stored in the download request storage circuit, wherein in response to the received transmission request, the transmission circuit sends the download request stored in the download request storage circuit, to the another device by which the received transmission request is sent.

3. The information distribution control apparatus in accordance with claim 2, wherein the transmission circuit sends, to the another device to which the download request is sent, a delivery request for delivering information corresponding to the download request sent to the another device.

4. The information distribution control apparatus in accordance with claim 3, wherein the receiving circuit receives, from the another device to which the delivery request is sent, the information corresponding to the download request sent to the another device.

5. The information distribution control apparatus in accordance with claim 2, further comprising:

a deletion request receiving circuit for receiving, from the another device to which the download request is sent, a deletion request for deleting the download request sent to the another device; and a download request deletion circuit for deleting the download request that is stored in the download request storage circuit and corresponds to the received deletion request.

6. The information distribution control apparatus in accordance with claim 1, wherein the collection circuit is for doing without collecting the download request from the another device when the decision circuit determines that any download request is not stored in the download request storage circuit.

7. The information distribution control apparatus in accordance with claim 1, further comprising: an identification information storage circuit for storing identification information for identifying the device with the built-in information distribution control apparatus, wherein the collection circuit collects identification information for identifying the another device from the another device, and the transmission circuit sends, to the server, the collected download request in correlation to the identification information collected from the another device, and the download request stored in the download request storage circuit in correlation to the identification information stored in the identification information storage circuit.

8. The information distribution control apparatus in accordance with claim 1, further comprising: a download request file creation circuit for creating a download request file for integrally recording the collected download request and the download request stored in the download request storage circuit, wherein the transmission circuit sends the created download request file to the server.

9. The information distribution control apparatus in accordance with claim 1, further comprising: a download request deletion circuit for deleting the download request that is stored in the download request storage circuit and corresponds to the information received from the server, in response to the information received from the server.

10. The information distribution control apparatus in accordance with claim 1, further comprising:

an information storage circuit for storing the information received from the server; and a delivery request receiving circuit for receiving from the another device a delivery request for delivering the portion of the information received from the server, wherein the delivery circuit distributes the portion of the information received from the server in response to the delivery request.

11. The information distribution control apparatus in accordance with claim 1, wherein the delivery circuit distributes the portion of the information received from the server together with a deletion request for deleting the download request corresponding to the portion of the information received from the server.

12. The information distribution control apparatus in accordance with claim 1, wherein the device is a printer, and the information distribution control apparatus is a network board installed in the printer.

* * * * *